(12) United States Patent
Matsuno

(10) Patent No.: US 8,427,672 B2
(45) Date of Patent: Apr. 23, 2013

(54) IMAGE PROCESSING DEVICE

(75) Inventor: Yoichiro Matsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1160 days.

(21) Appl. No.: 12/125,387

(22) Filed: May 22, 2008

(65) Prior Publication Data

US 2008/0304112 A1    Dec. 11, 2008

(30) Foreign Application Priority Data

Jun. 7, 2007    (JP) .................................. 2007-152026
Apr. 18, 2008    (JP) .................................. 2008-109513

(51) Int. Cl.
*H04N 1/00*    (2006.01)

(52) U.S. Cl.
USPC .......... 358/1.15; 358/400; 358/401; 358/402; 358/403; 358/1.16; 358/1.14; 358/1.18

(58) Field of Classification Search .................... 358/403
See application file for complete search history.

(56) References Cited

U.S. PATENT DOCUMENTS

2006/0028691 A1 *   2/2006   Shinomiya .................... 358/402

FOREIGN PATENT DOCUMENTS

| JP | 2006-50373 | 2/2006 |
| JP | 2007-25786 | 2/2007 |

OTHER PUBLICATIONS

Lars Erik Holmquist, "Flip Zooming: An Alternative to Distortion-Based Focus+Context Views", Master's Thesis, Computing Science, [Online] 1996, the whole document (37 pages), XP009104025.
Schneiderman B Ed—Schneiderman B : "Designing the user interface: Strategies for effective human-computer interaction", Designing the User Interface. Strategies for Effective Human Computer Interaction, Reading, Addison Wesley, US, Jan. 1, 1992, the whole document (45 pages), XP-002210867.

* cited by examiner

*Primary Examiner* — Vincent Rudolph
*Assistant Examiner* — Pawandeep Dhingra
(74) *Attorney, Agent, or Firm* — Oblon, Spivak, McClelland, Maier & Neustadt, L.L.P.

(57) ABSTRACT

An image processing device includes a document storing unit which stores document information containing scanned images and fax transmission/reception images sent from a plurality of users. A metadata outputting unit generates a metadata of the document information stored by the document storing unit and distributes the metadata. A display format file supplying unit supplies a display conversion file linked to the metadata. A zooming process file supplying unit supplies a zooming process file linked to the metadata. A document information supplying unit reads a document information item, requested at a time of displaying, from the document storing unit and supplies the document information item.

16 Claims, 22 Drawing Sheets

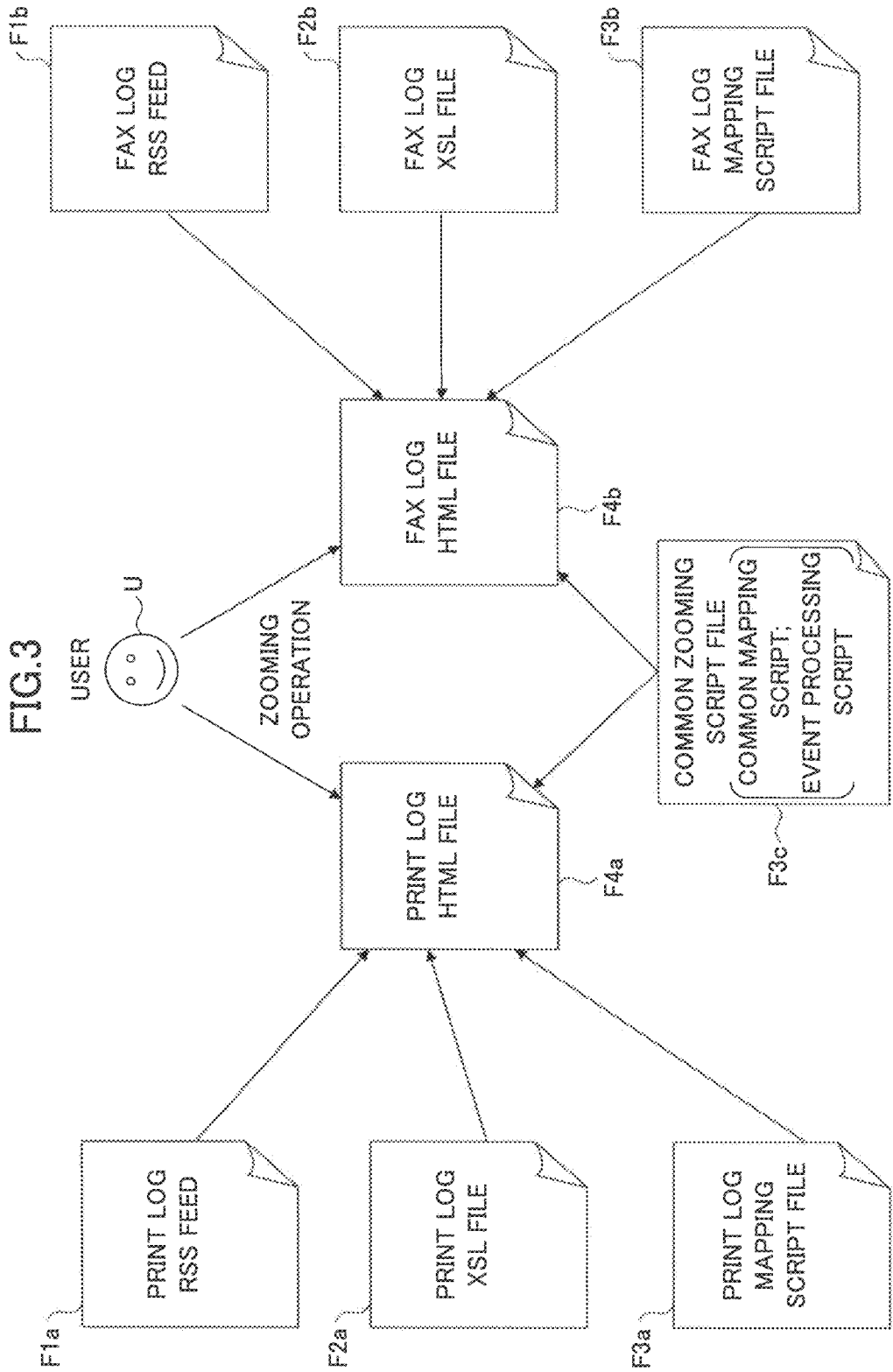

FIG.5A

```
<?XML ......?>
<?xml-stylesheet href="zooming.xsl" ?>
<feed ....>
  <title>MFP:192.168.21.12...</title>
  .....
  <entry>
    <title>Document1</title>
    ....
  </entry>
  <entry>...</entry>
</feed>
```
F1

FIG.5B

```
<?xml-stylesheet href="" ... ?>

<xsl:stylesheet version="1.0" >
    <xsl:template name="htmlhead">
      <!-- stylesheets and script -->
      <link rel="stylesheet" href="./hogehge.css" type="text/css" />
      <link rel="stylesheet" href="./hgoe.css" type="text/css" />
      <script type="text/javascript" src="./zooming.js">//</script>
    </xsl:template>
    ......
</xsl:stylesheet>
```
F2

| IMAGE FILE | |
|---|---|
| TITLE | http://india.src.*.co.jp:8080/SIProcessor/servlet/SIProcessorServle?ImageURL=http%3A%2F%2Findia.src.*.co.jp%3A8080%2Fstorage%2Fsiindexer%2FconvImage%2Fweb%2F1000%2Fdoc15134.dir%2F2.bmp&Script=Crop+Rectangle+309+139+468+112 |
| THUMBNAIL | ii.doc |
| KEY | http://india.src.***.co.jp:3080/thumbnail/Web/6000/ |
| NAME | http://sari.src.***.co.jp/proj/still/siweb/v100/datase |
| TYPE | null |
| TEXT | KD_OTHER |
| NEIGHBORING TEXT | ■COLOR TONE ■COLOR DISTRIBUTION |
| X0 | 309 |
| Y0 | 139 |
| X1 | 776 |
| Y1 | 250 |

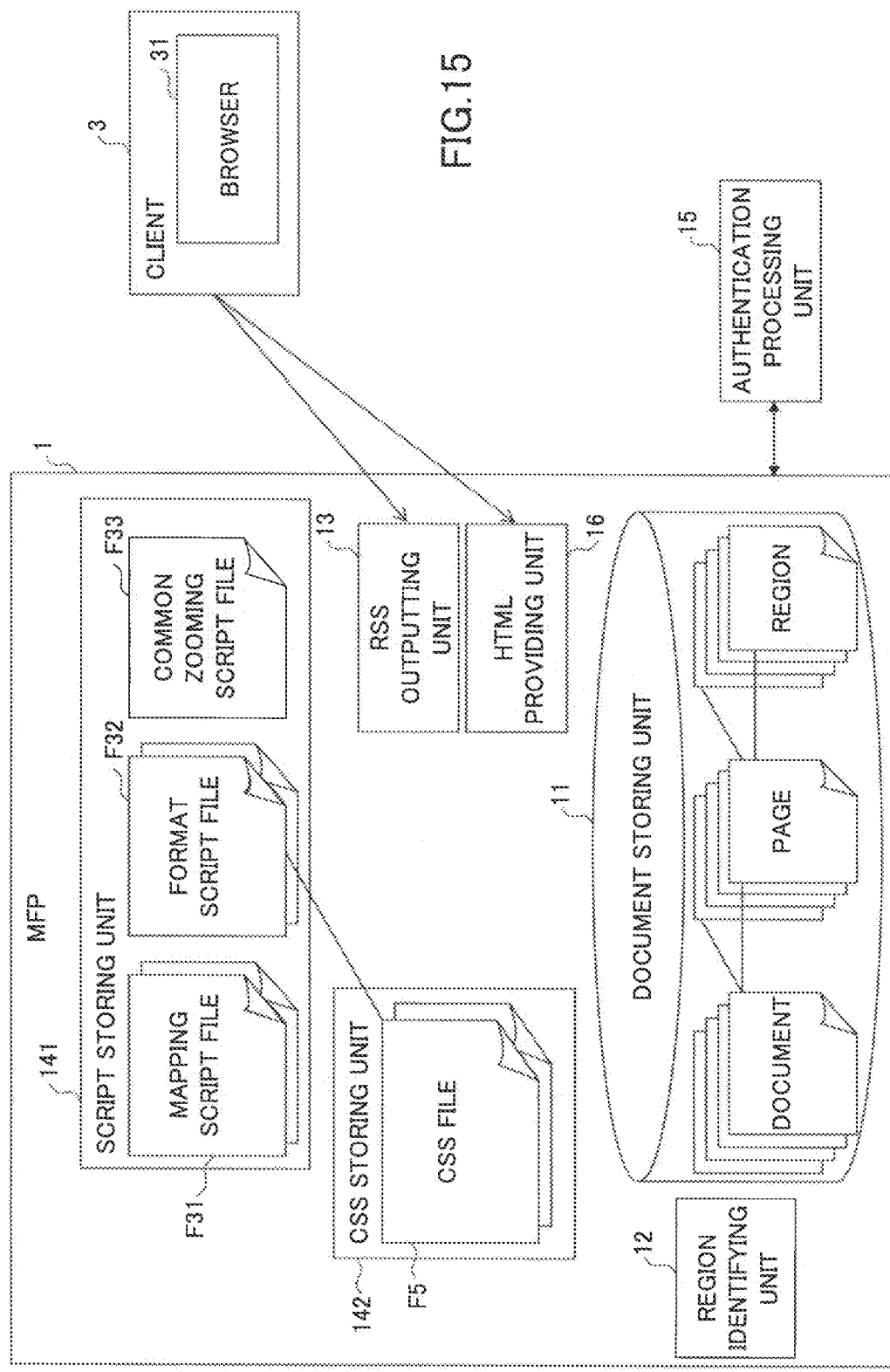

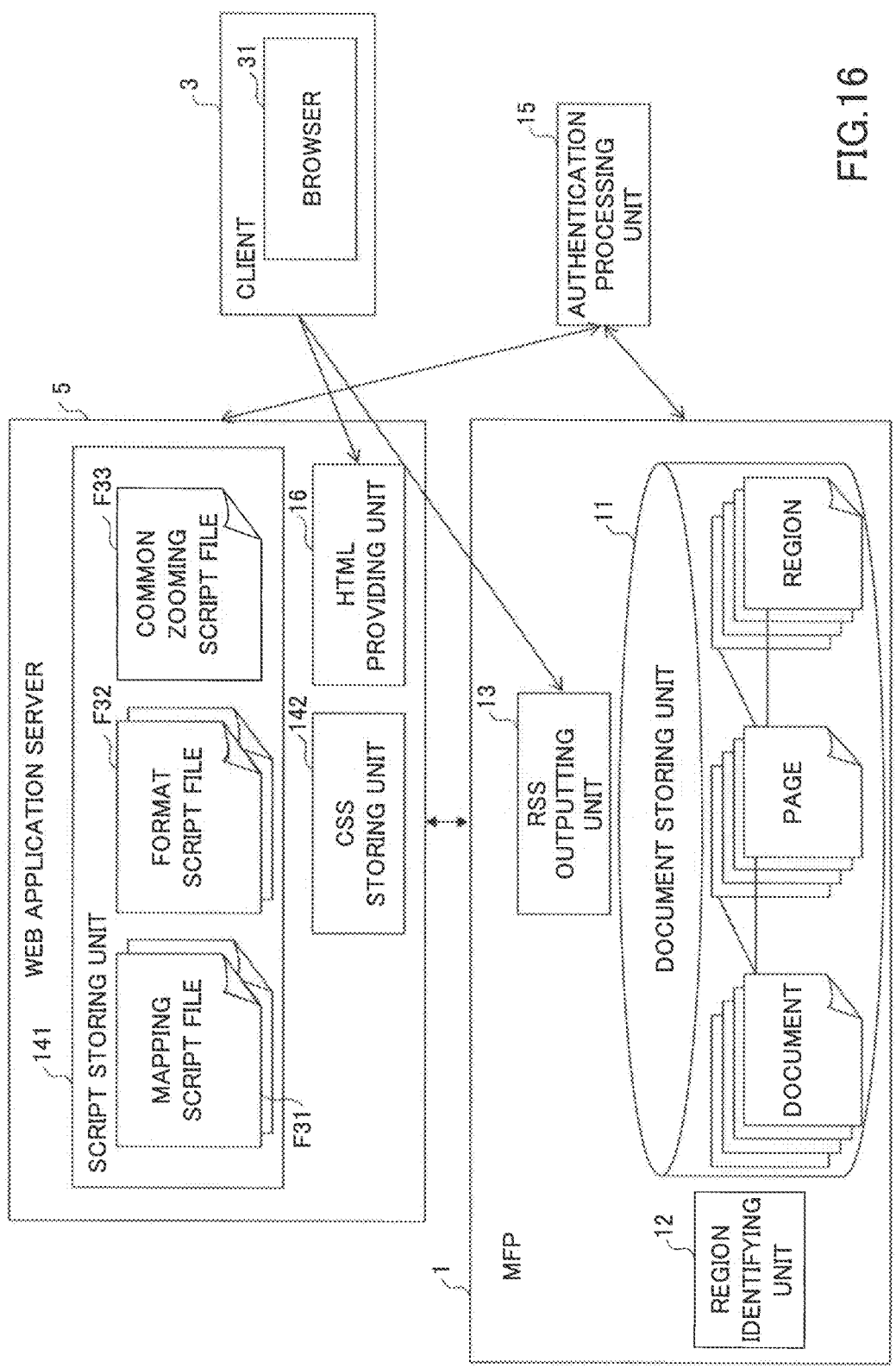

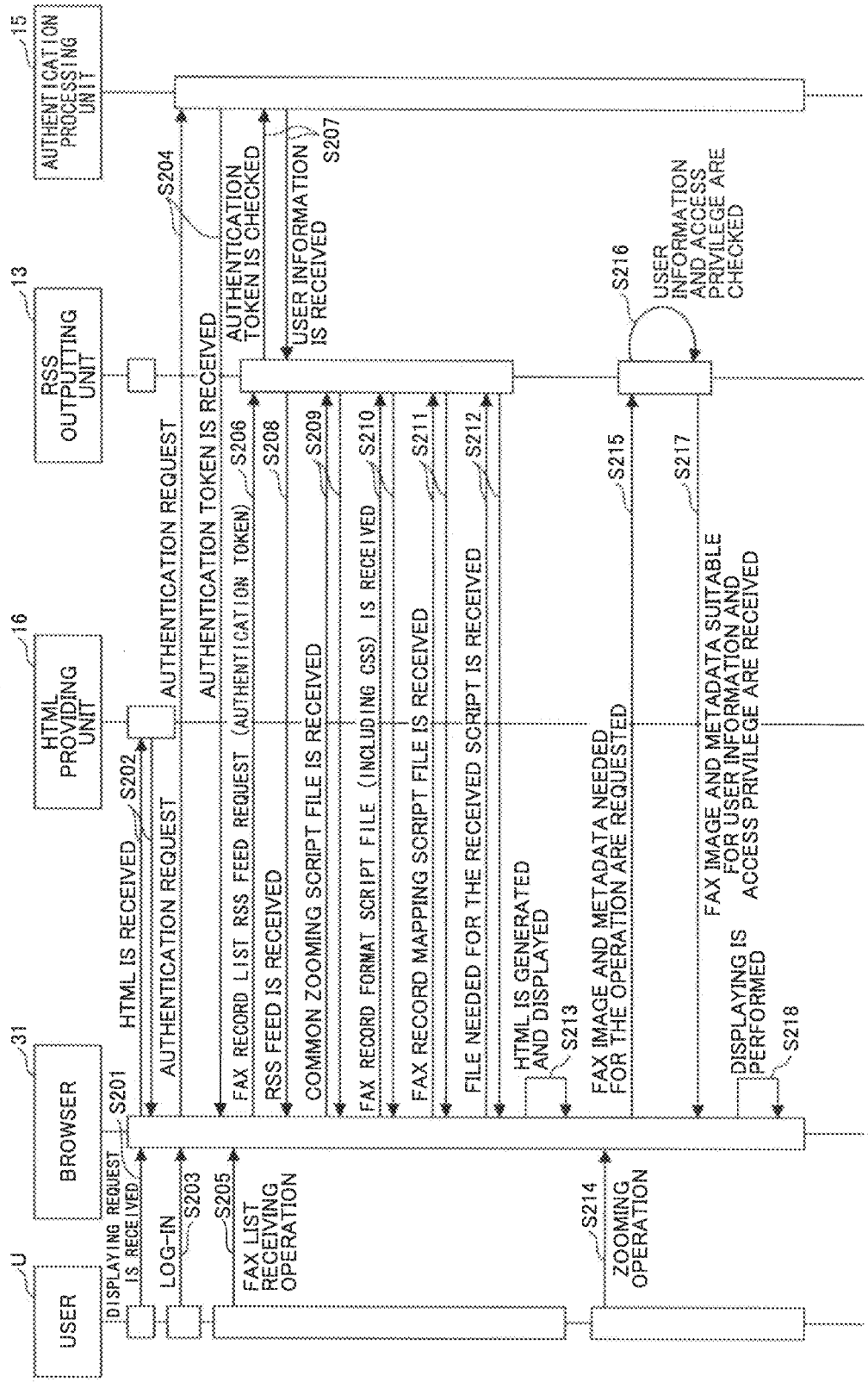

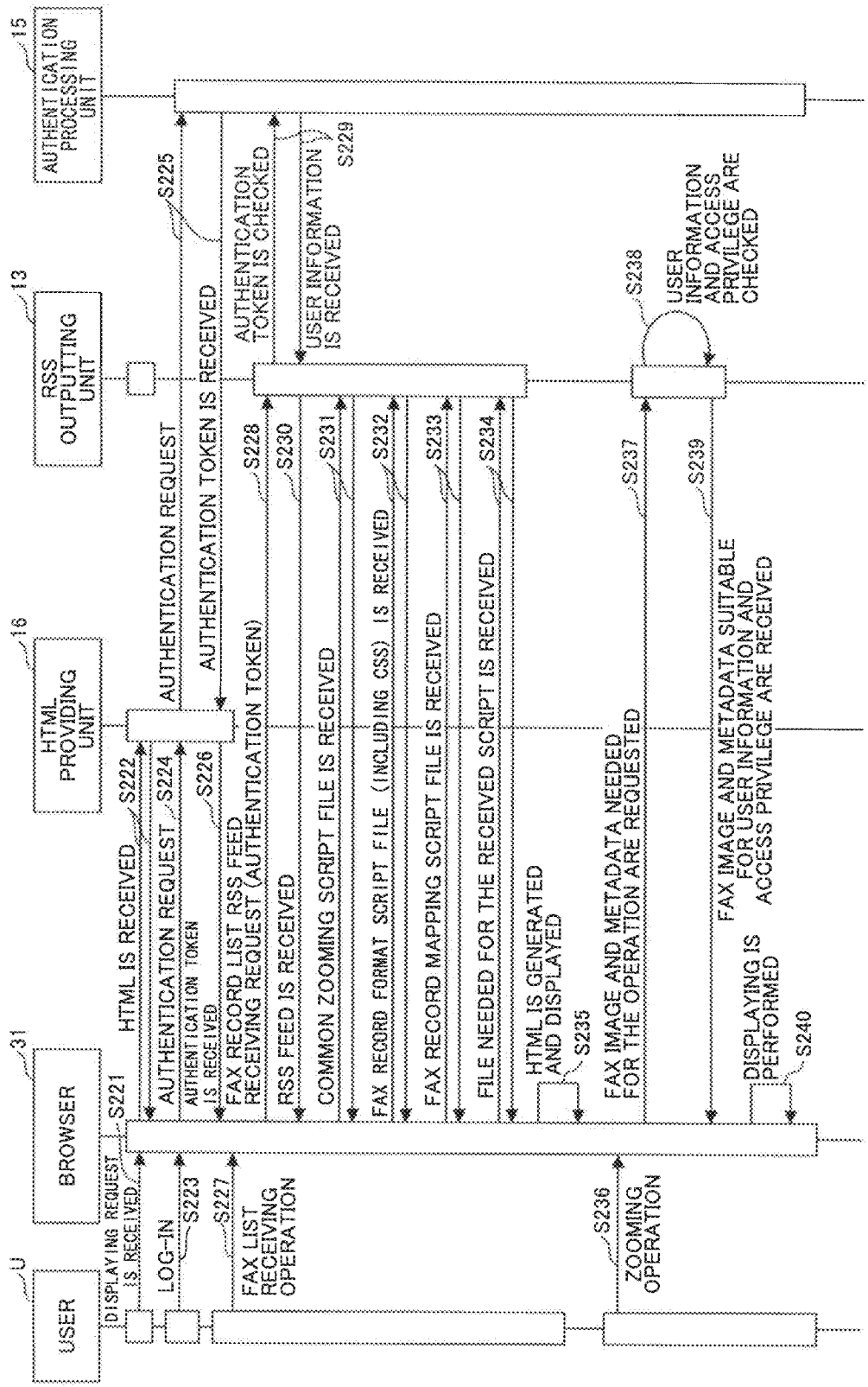

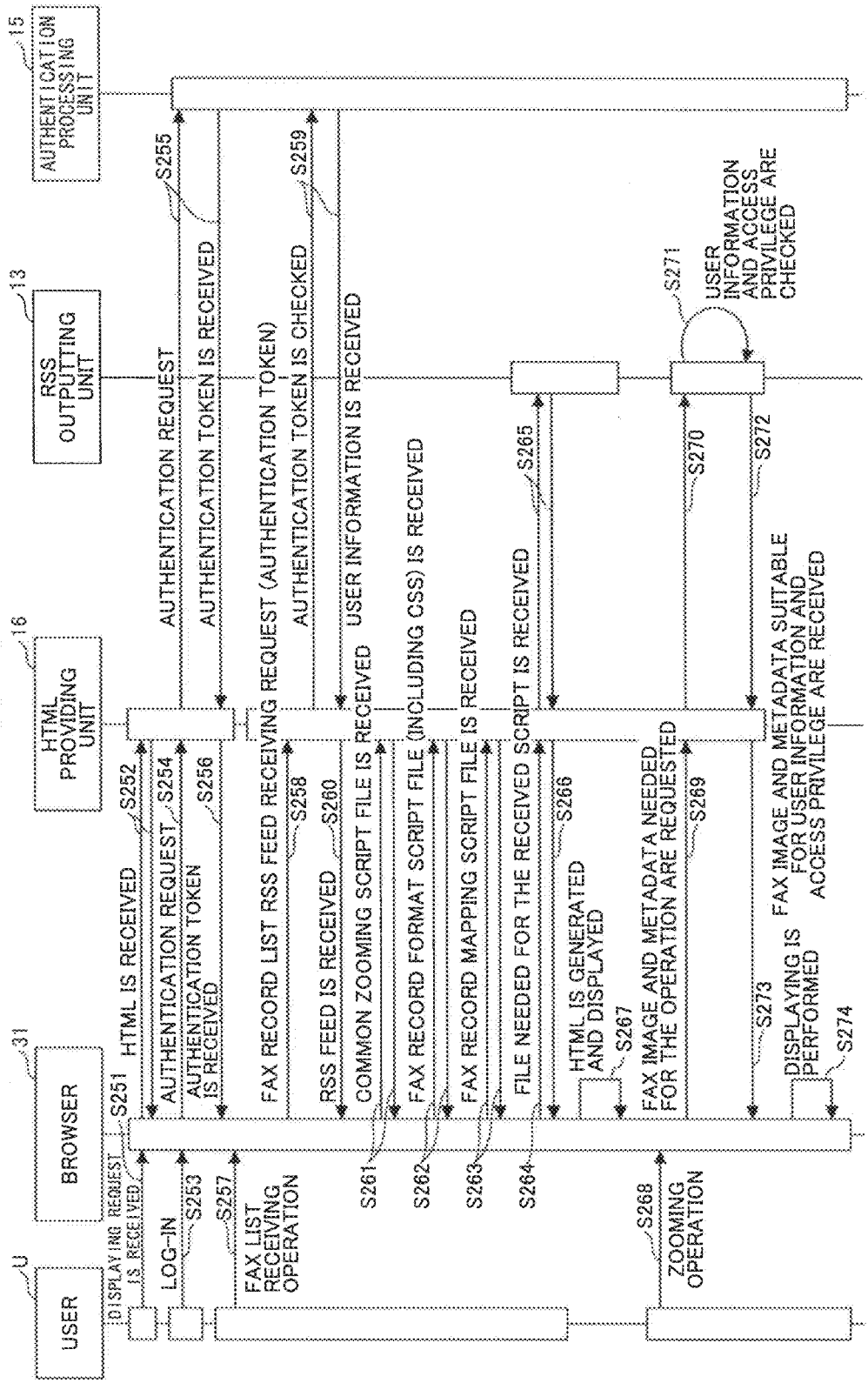

FIG.20

```
<?XML..?>
<feed ...>
<title>MFP:192.168.21.12</title>
...
<link rel="zooming_base" type="application/x-javascript"
 href=http://192.168.21.12/xxxx/zooming/base.js/>         } 101
<link rel="zooming_fax" type="application/x-javascript"
 href=http://192.168.21.12/xxxx/zooming/model/fax.js/>    } 102
<link rel="zooming_fax" type="application/x-javascript"
 href=http://192.168.21.12/xxxx/zooming/mapping/fax01.js/> } 103
<entry>
<title>FAXdocument930192-090-3f</title>
...
<content type="xhtml">
    ┌─────────────────────────┐
    │  INITIAL DISPLAY CONTENT │                          } 104
    └─────────────────────────┘
</content>
</entry>
<entry>...<entry>
</feed>
```

FIG.21

```
<fax>
<title>
<div class="thumbnail" id="01">
  <img href="..."/>
</div>
<div class="summary" id="02">
  <img href="..."/>
</div>
<div class="representative" id="03">
  <imag href="..."/>
</div>
<div class="pages" id="04">
  <div class="page" id="p-1">
    <img href="..."/>
  </div>
  ...
</div>
</fax>
```

105

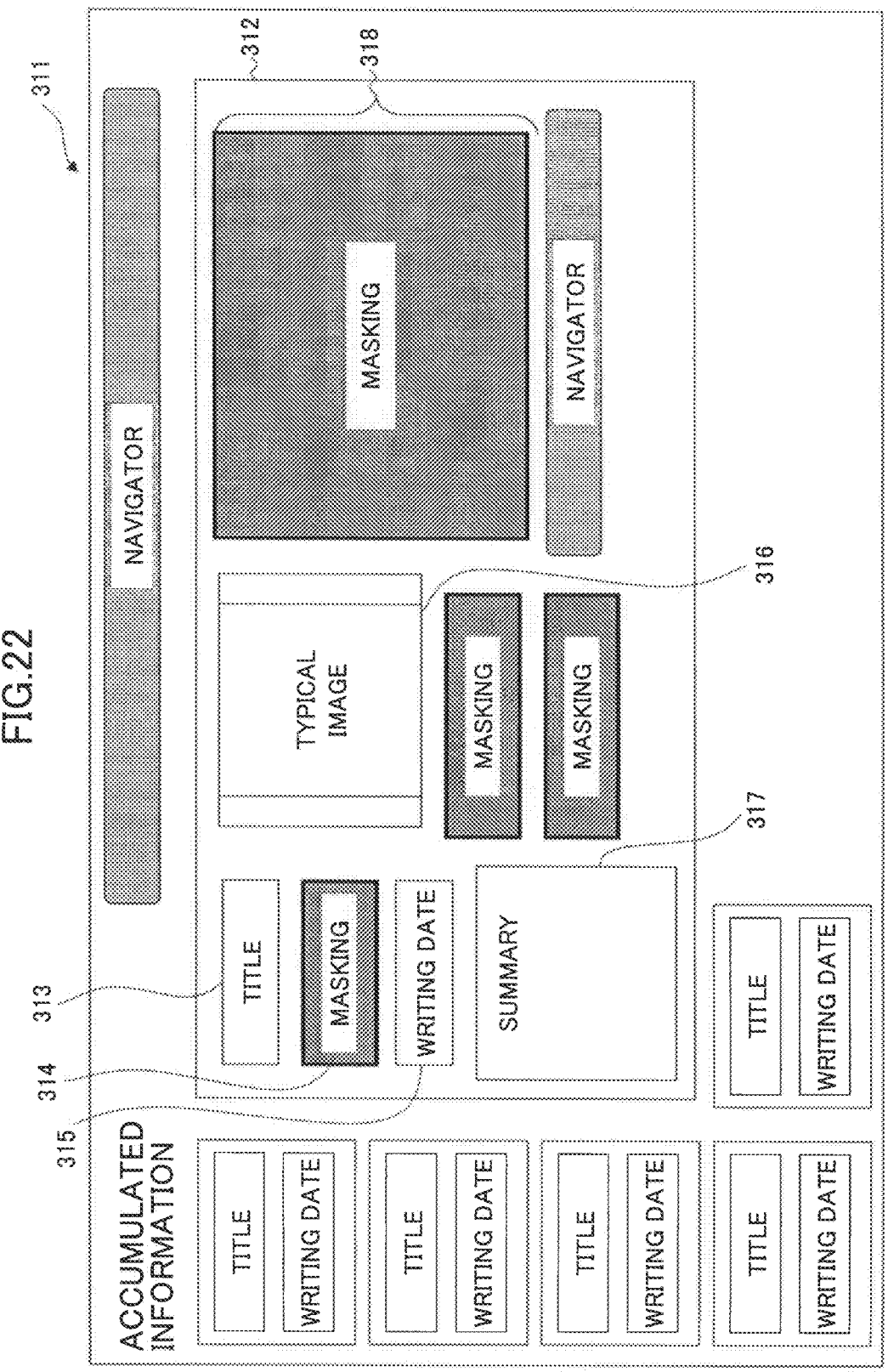

IMAGE PROCESSING DEVICE

BACKGROUND OF THE INVENTION

1. Field of the Invention

This invention relates to an image processing device for use in an image forming device, such as a multi-function peripheral.

2. Description of the Related Art

Many multi-function peripherals (MFP) are provided with the functions of document image storing, fax image transmission and fax image reception, and some of the multi-function peripherals have the function of viewing any of document images stored or fax images received or transmitted.

In recent years, there has been proposed a network communication device which is arranged to distribute metadata, such as fax transmission/reception records, by using RSS formats. For example, see Japanese Laid-Open Patent Application No. 2006-050373. RSS formats are specified using XML (Extensible Markup Language), a generic specification for the creation of data formats.

RSS formats are used to describe metadata, such as Web site headlines or summaries. The initials "RSS" are used to refer to the following formats: Rich Site Summary, Really Simple Syndication, or RDF (Resource Description Framework) Site Summary.

The RSS distribution by the above-mentioned communication device makes it possible for users to view RSS content using a general-purpose browser in which an RSS reader is incorporated, without needing dedicated viewer software for viewing RSS documents.

When the distributed RSS is received at a client, such as PC (personal computer), the user on the client can view the bibliographic information and thumbnail image contained in the received RSS, using the general-purpose browser. The user makes a judgment as to whether the main document image is to be accessed. The user accesses a file of the main document image, if needed, to view the content of the file concerned.

Accessing the file of the main document image may be performed by selecting the link to the URL (Uniform Resource Locator) of the document image file included in the bibliographic information through mouse operation.

As described above, use of the RSS distribution enables the user to easily view document information using a general-purpose browser. However, there is a case in which the bibliographic information or thumbnail image contained in the RSS is not sufficient for the user to judge that the desired document is discovered.

Specifically, when the user cannot judge that the desired document is discovered, only with the bibliographic information, the user has to make the judgment by viewing the thumbnail image. However, in many cases, fine characters or fine drawings in the thumbnail image are illegible, and it is difficult to determine whether the desired document is discovered.

Moreover, the thumbnail image usually is an image of a typical page, such as a first page of a document. In a case of document information covering a plurality of pages or fax transmission/reception images, the user cannot easily read the images of other pages than the typical page.

For this reason, there are an increasing number of cases in which the user has to access the main document image. However, if the desired document is not found after the main document image is viewed, the user must return to the viewing screen, such as the bibliographic information, and must repeat the same process for other document images. Accordingly, the viewing operation by the user is discontinued and it is difficult to perform efficient viewing operation.

SUMMARY OF THE INVENTION

In one aspect of the invention, the present disclosure provides an improved image processing device in which the above-described problems are eliminated.

In one aspect of the invention, the present disclosure provides an image processing device which is able to perform efficient viewing operation to view the stored document information.

In an embodiment of the invention which solves or reduces one or more of the above-mentioned problems, the present disclosure provides an image processing device comprising: a document storing unit configured to store document information containing scanned images and fax transmission/reception images sent from a plurality of users; a metadata outputting unit configured to generate a metadata of the document information stored by the document storing unit and distribute the metadata; a display format file supplying unit configured to supply a display conversion file linked to the metadata; a zooming process file supplying unit configured to supply a zooming process file linked to the metadata; and a document information supplying unit configured to read a document information item, requested at a time of displaying, from the document storing unit and supply the document information item.

The above-mentioned image processing device may be arranged to further comprise an authentication unit which is configured to authenticate a user who performs a login procedure, and supply user information, wherein the metadata outputting unit is configured to generate a metadata of a document information item with a viewing authority of the user in accordance with the user information and distribute the metadata, and the document information supplying unit is configured to distribute the document information item with the viewing authority of the user in accordance with the user information.

The above-mentioned image processing device may be arranged so that the zooming process file includes: a mapping script which associates a display element, contained in a displaying file produced from the display conversion file, with a zooming process; and an event processing script which performs a zooming process to the display element in response to operation of a user.

The above-mentioned image processing device may be arranged so that the document storing unit is configured to manage the document information in hierarchical levels according to components of the document information.

The above-mentioned image processing device may be arranged so that the metadata outputting unit is configured to distribute the metadata according to hierarchical levels of components of the document information.

The above-mentioned image processing device may be arranged so that the metadata includes an RSS feed which is an XML based format.

The above-mentioned image processing device may be arranged so that the display conversion file is an XSL file which converts the RSS feed in an HTML format to generate an HTML file.

The above-mentioned image processing device may be arranged so that the display conversion file includes a format script file and a CSS file which convert the RSS feed in an HTML format to generate an HTML file.

In an embodiment of the invention which solves or reduces one or more of the above-mentioned problems, the present disclosure provides a viewing control method comprising the steps of: storing document information containing scanned images and fax transmission/reception images sent from a plurality of users; generating a metadata of the document information stored to distribute the metadata; supplying a display conversion file linked to the metadata; supplying a zooming process file linked to the metadata; and reading a document information item, requested at a time of displaying, to supply the document information item.

In the image processing device of the invention, it is possible to perform efficient viewing operation to view the stored document information, without discontinuing the operation, because the user is enabled to perform zoom-in/zoom-out operation in the screen by specifying freely a display element displayed in the screen.

Other objects, features and advantages of the present invention will become more apparent from the following detailed description when read in conjunction with the accompanying drawings.

BRIEF DESCRIPTION OF THE DRAWINGS

FIG. 3 is a diagram for explaining the relationship between various files.

FIG. 5A and FIG. 5B are diagrams showing examples of an RSS feed and an XSL file.

FIG. 13A and FIG. 13B are diagrams showing examples of screens displayed by the browser.

FIG. 15 is a diagram showing the composition of a second example of the image processing device of the second embodiment.

FIG. 16 is a diagram showing the composition of a third example of the image processing device of the second embodiment.

FIG. 17 is a sequence diagram for explaining the process performed by the first example of the image processing device of the second embodiment.

FIG. 18 is a sequence diagram for explaining the process performed by the second example of the image processing device of the second embodiment.

FIG. 19 is a sequence diagram for explaining the process performed by the third example of the image processing device of the second embodiment.

FIG. 20 is a diagram showing an example of an RSS feed output to the browser immediately after authentication.

FIG. 21 is a diagram showing an example of an initial display content contained in the RSS feed of FIG. 20.

FIG. 22 is a diagram showing an example of masking of the display in the process of zooming operation.

DETAILED DESCRIPTION OF THE PREFERRED EMBODIMENTS

A description will be given of embodiments of the invention with reference to the accompanying drawings.

Figure 1:
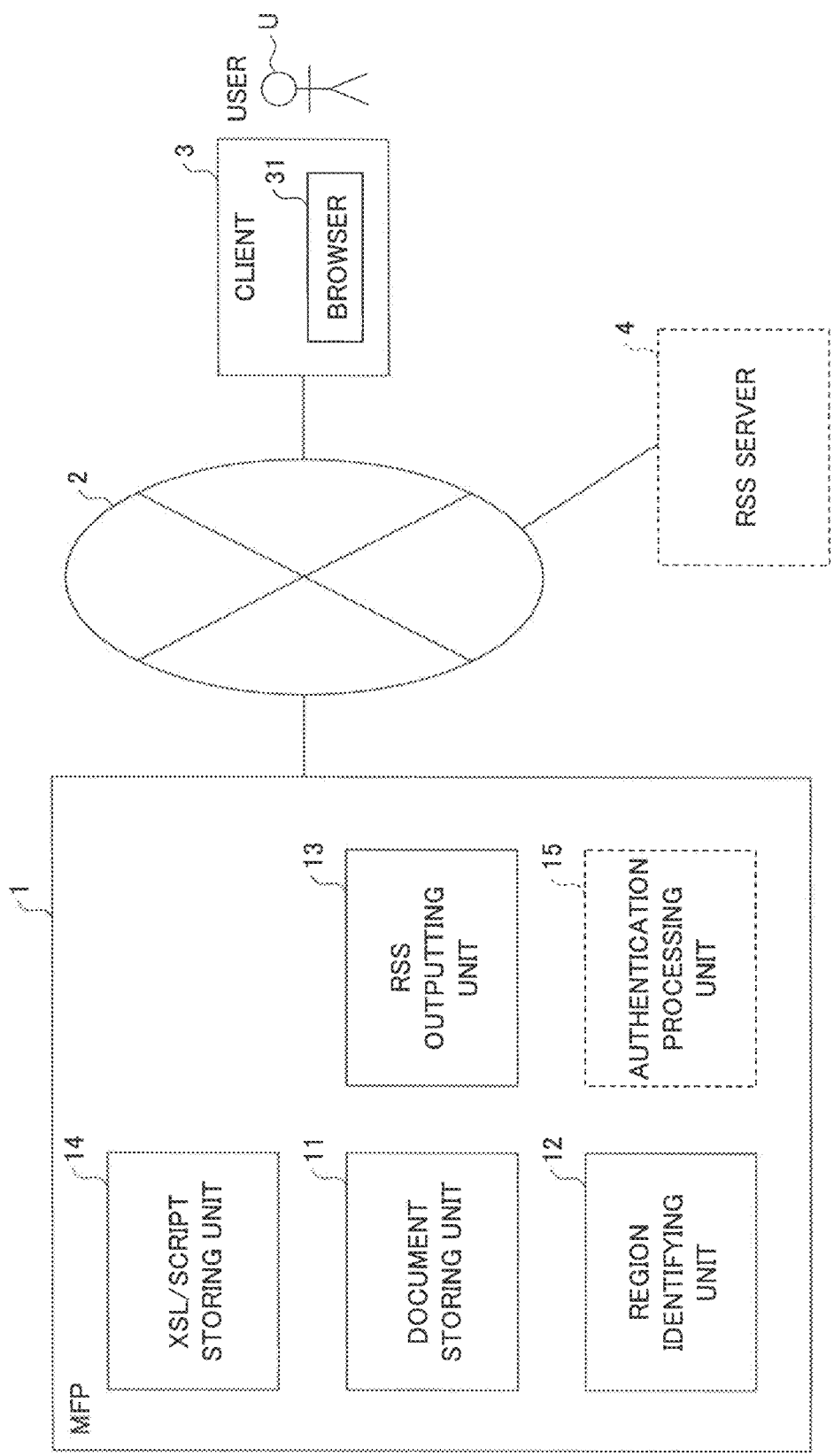
FIG. 1 is a diagram showing the composition of a network system to which an image processing device of a first embodiment of the invention is applied.

FIG. 1 shows the composition of a network system to which an image processing device of a first embodiment of the invention is applied.

In the network system shown in FIG. 1, an MFP 1 which is the image processing device of this embodiment, a client 3 (such as PC) which is operated by a user U, and an RSS server 4 are interconnected via a network 2. The RSS server 4 relays distribution of an RSS from the MFP 1. Specifically, the RSS server 4 stores an RSS feed distributed from the MFP 1, and supplies the stored RSS feed to the client 3.

In a case in which an RSS feed is supplied to the client 3 directly from the MFP 1, the RSS server 4 may be omitted from the network system shown in FIG. 1.

The MFP 1 in this embodiment includes a document storing unit 11, a region identifying unit 12, an RSS outputting unit 13, an XSL/script storing unit 14, and an authentication processing unit 15.

The document storing unit 11 stores document images (body images, thumbnail images) and their bibliographic information (date, title, writer, summary, etc.).

The region identifying unit 12 analyzes the content of a document image, identifies regions (character regions, image regions, etc.), and adds information relating to the regions to the document storing unit 11.

The RSS outputting unit 13 generates an RSS feed based on the document image, bibliographic information, etc. which are stored in the document storing unit 11, and outputs the RSS feed to the network 2.

The XSL/script storing unit 14 stores an XSL (Extensible Stylesheet Language) file and a zooming script file which are linked to the RSS feed output from the RSS outputting unit 13, and supplies corresponding files in response to a file receiving request.

The authentication processing unit 15 performs authenticating processing when it is necessary to restrict the viewers who are permitted to view the document information in the MFP 1.

In the client 3, a general-purpose browser 31 is arranged. This browser 31 receives an RSS feed, an XSL file, and a script file from the MFP 1 or the RSS server 4, generates a HTML (Hyper Text Markup Language) file from the received files, and performs displaying of the HTML file on the monitor screen.

Figure 2:
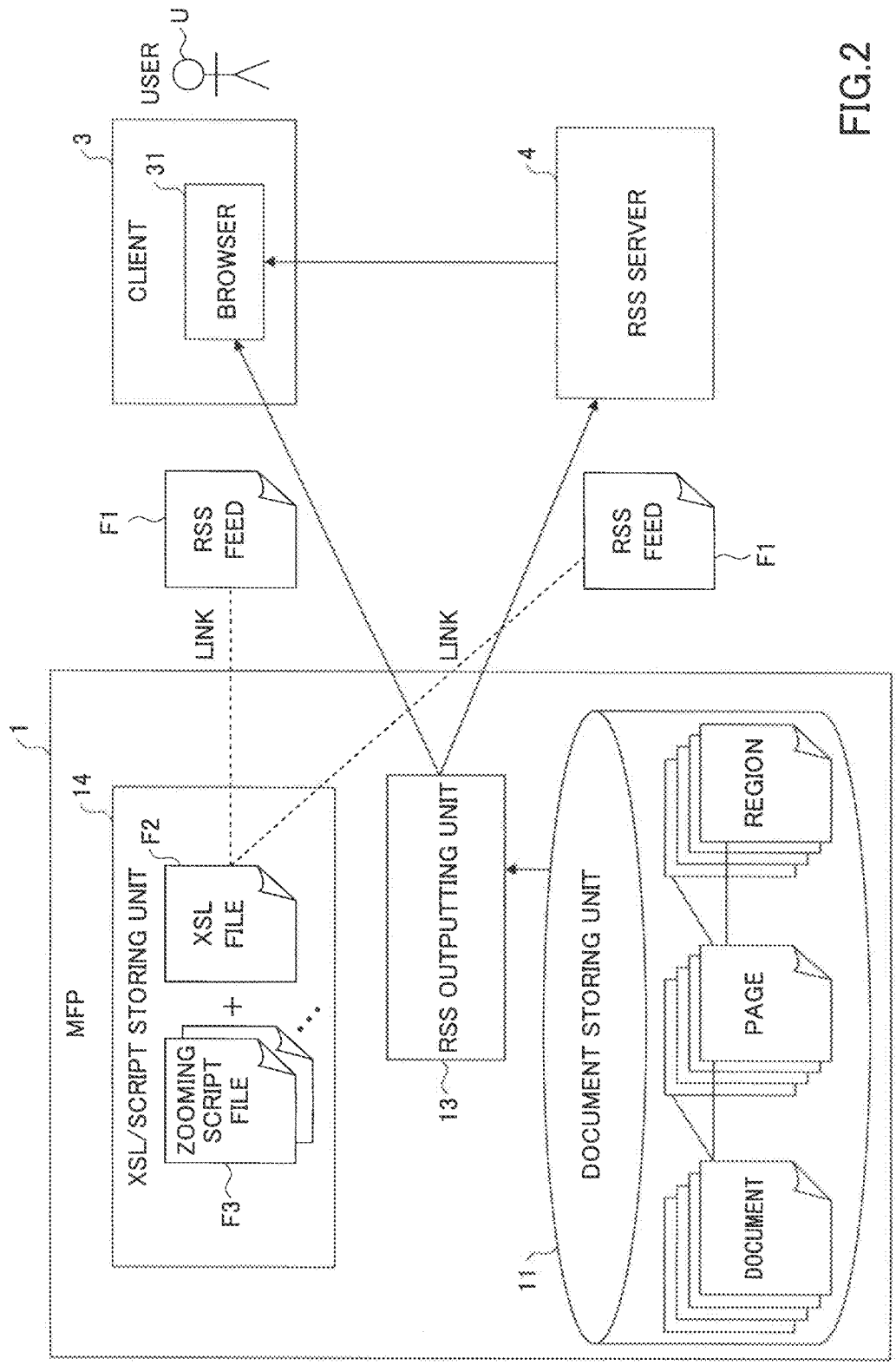
FIG. 2 is a diagram for explaining the flow of information in the network system of FIG. 1.

FIG. 2 is a diagram for explaining the flow of information flow in the network system of FIG. 1.

As shown in FIG. 2, in the document storing unit 11 of the MFP 1, document images and bibliographic information are managed for each of the hierarchical arrangements of documents, pages, and regions. Specifically, each of the documents contains one or more pages, and each page contains one or more regions in the document storing unit 11.

When it is not necessary to subdivide each page into regions, the hierarchical arrangements of regions may be omitted. On the other hand, when it is necessary to subdivide each region into sub-regions, the hierarchical arrangements of sub-regions may be provided additionally in the document storing unit 11.

The XSL/script storing unit 14 of the MFP 1 holds an XSL file F2 for converting an RSS feed in an HTML format to generate an HTML file, and a zooming script file F3 for enabling zooming operation to the display elements (objects) contained in a generated HTML file. A style sheet description may be separated from the XSL file F2 as another CSS (Cascading Style Sheet) file.

The zooming script file F3 includes a mapping script file which associates the display elements contained in the generated HTML file with a zooming process (mapping), and an event processing script file which performs a zooming process in response to an input operation of the mouse by the user U using the mouse or the keyboard.

The RSS outputting unit 13 generates an RSS feed F1 based on the information stored in the document storing unit 11, and distributes the RSS feed to the client 3 or the RSS server 4.

The XSL file F2 and the zooming script file F3 are linked to the RSS feed F1. When the RSS feed F1 is processed by the browser 31, the XSL file F2 and the zooming script file F3 are read out in accordance with the links.

FIG. 3 is a diagram for explaining the relationship between various files. The example of FIG. 3 is applicable to a print log and a fax log.

As shown in FIG. 3, a print log HTML file F4a is generated from the common mapping script portions of a print log RSS feed F1a, a print log XSL file F2a, a print log mapping script file F3a, and a common zooming script file F3c. A fax log HTML file F4b is generated from the common mapping script portions of a fax log RSS feed F1b, a fax log XSL file F2b, a fax log mapping script file F3b, and the common zooming script file F3c.

A zooming process is performed by operation of the event processing script portion of the common zooming script file F3c when the user U performs mouse operation to the print log HTML file F4a or the fax log HTML file F4b.

Figure 4A:
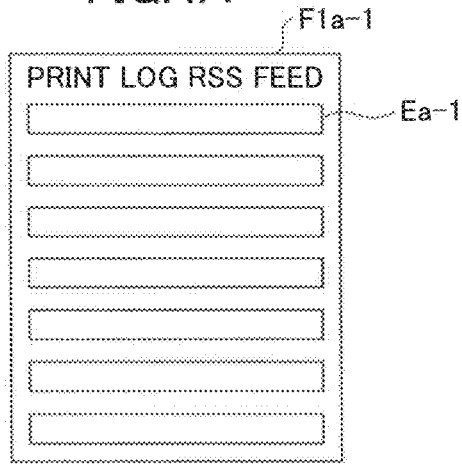
FIG. 4A, FIG. 4B, FIG. 4C, FIG. 4D, and FIG. 4E are diagrams showing examples of the hierarchical arrangements of RSS feeds.
Figure 4D:
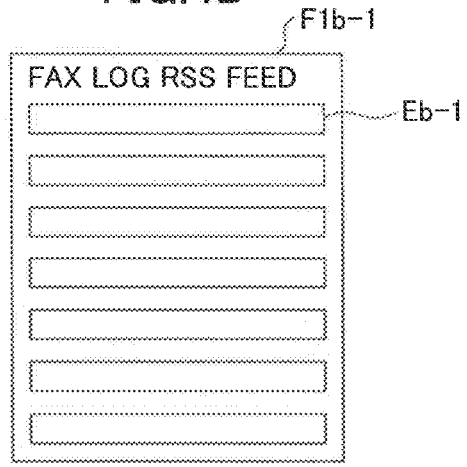
Figure 4B:
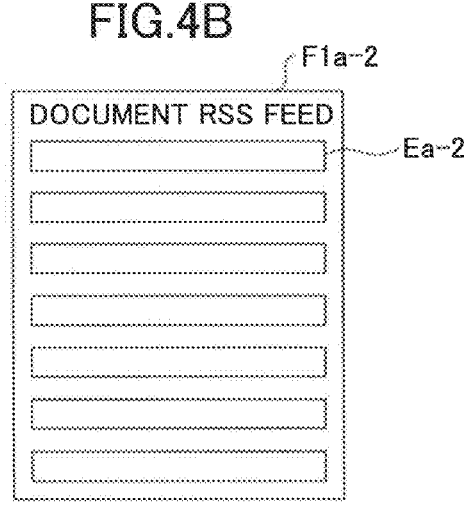
Figure 4E:
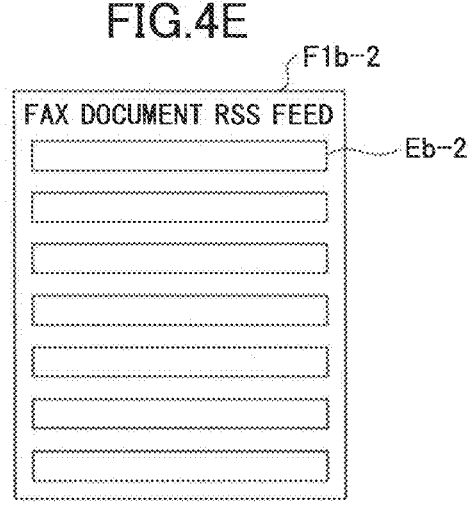
Figure 4C:
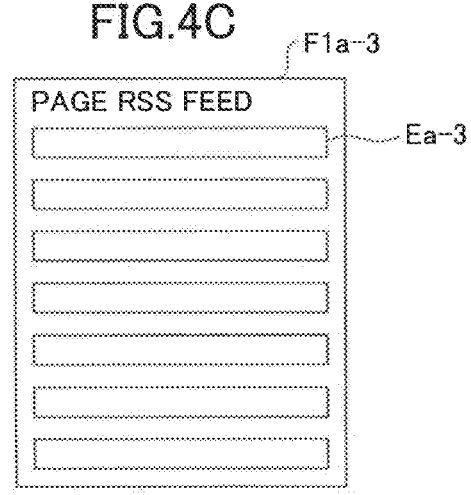

FIGS. 4A through 4E are diagrams showing examples of the hierarchical arrangements of RSS feeds. FIGS. 4A-4C show examples of the print log RSS feed F1a, and FIGS. 4D and 4E show examples of the fax log RSS feed F1b.

As shown in FIG. 4A, the print log RSS feed F1a has a print log RSS feed F1a-1 at the uppermost position and contains a plurality of document entries Ea-1. As shown in FIG. 4B, each of the document entries Ea-1 has a document RSS feed F1a-2 and contains a plurality of page entries Ea-2. As shown in FIG. 4C, each of the page entries Ea-2 has a page RSS feed F1a-3 and contains a plurality of region entries Ea-3.

As shown in FIG. 4D, the fax log RSS feed Fib has a fax log RSS feed F1b-1 at the uppermost position and contains a plurality of fax document entries Eb-1. As shown in FIG. 4E, each of the fax document entries Eb-1 has a fax document RSS feed F1b-2 and contains a plurality of page entries Eb-2. Each page entry may be subdivided into a plurality of region entries.

FIG. 5A and FIG. 5B show examples of an RSS feed and an XSL file. FIG. 5A shows an example of an RSS feed F1, and FIG. 5B shows an example of an XSL file F2.

As shown in FIG. 5A, the RSS feed F1 includes a description indicating the link to the XSL file F2: "<?xml-stylesheet href="zooming.xsl"?>", a description indicating the URL of an MFP which performs the RSS outputting: "<title>MFP: 192.168.21.12 . . . </title>", and a description indicating a plurality of entries: "<entry> . . . </entry>".

As shown in FIG. 5B, the XSL file F2 includes a description indicating the link to a CSS file: "<link rel="stylesheet" href="./hogehge.css" type="text/css"/>", "<link rel="stylesheet" href="./hgoe.css" type="text/css"/>", and a description indicating the link to the zooming script file: "<script type="text/javascript" src="./zooming.js">//</script>".

Figure 6A:
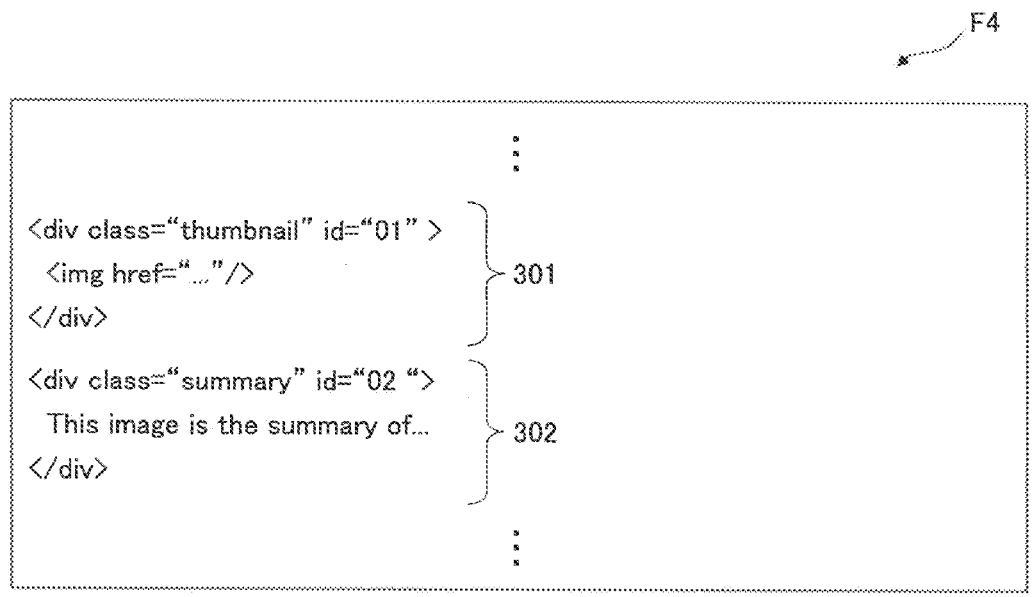
FIG. 6A shows examples of descriptions of block elements in a generated HTML file.
Figure 6B:
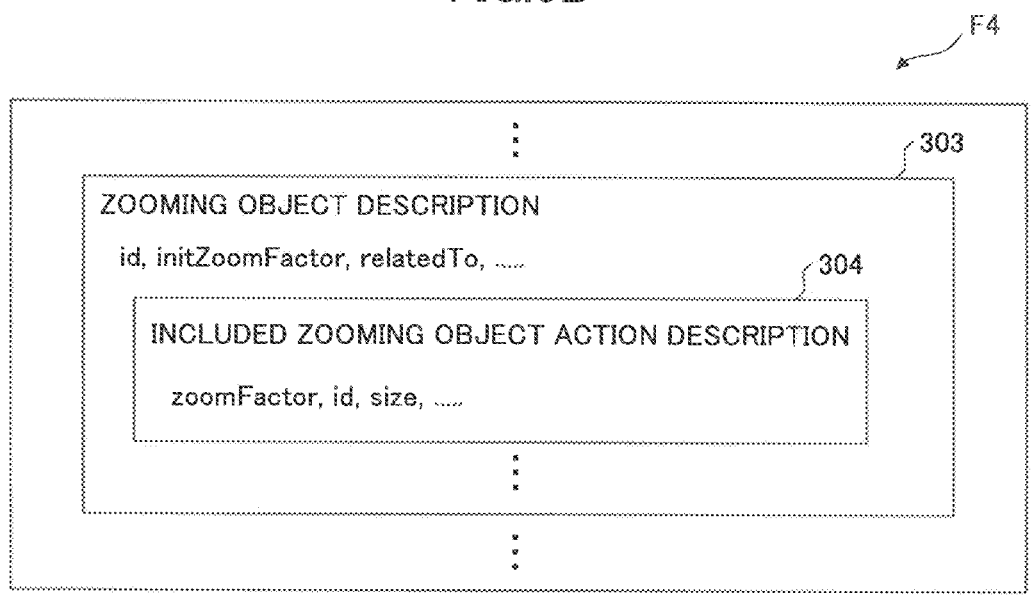
FIG. 6B shows an example of a zooming object description in the HTML file.

FIG. 6A shows examples of descriptions of block elements in an HTML file F4, which is generated from an RSS feed F1, an XSL file F2, and a zooming script file F3. FIG. 6B shows an example of a zooming object description in the HTML file F4.

The mapping script contained in the zooming script file F3 refers to the class descriptions "class="thumbnail"" and "class="summary"" contained in the descriptions 301 and 302 of the block elements "<div . . . > . . . </div>" in the HTML file F4 shown in FIG. 6A. For example, assume that "thumbnail" corresponds to a typical image and "summary" corresponds to a summary, the IDs "id="01"" and "id="02"" are mapped to the IDs of a zooming object description.

FIG. 6B shows an example of a zooming object description 303 in the HTML file F4. A zooming object description 303 is generated in correspondence with each of the displaying objects in the HTML file F4. In this zooming object description 303, parameters including "id", "initZoomFactor", "relatedTo", etc. are set up. The parameter "id" identifies a displaying object in the HTML file F4. The parameter "initZoomFactor" indicates the zooming factor at a time of initial displaying. The parameter "relatedTo" indicates the relation of another object to which the zoom operation of the object concerned is transmitted, and the transmission ratio.

The ID of a corresponding block element (FIG. 6A) in the mapping script is set to the parameter "id". The value which indicates the degree of zooming is set to "initZoomFactor". For example, if the zooming factor is set up to "0.0", the image is displayed in the original display size. If the zooming factor is set up to a positive value, an expanded image is displayed. If the zooming factor is set up to a negative value, a reduced image is displayed.

For example, if the "relatedTo" is set up as "children:0.8", the zoom operation of the object concerned is transmitted to the other included object by the transmission ratio "0.8". If the "relatedTo" is set up as "brother:−0.5", the zoom operation of the object concerned is transmitted with reversed polarity to the other parallel-relation object by the transmission ratio "0.5". Specifically, if the zoom-in operation of the object concerned is performed, the zoom-out operation of the other parallel-relation object is performed by the transmission ratio "0.5".

Moreover, in the zooming object description 303, an included zooming object action description 304 which defines the displaying action of each of other included displaying objects is included. In the included zooming object action description 304, the parameters including "zoomFactor", "id", "size", etc. are set up. The parameter "zoomFactor" indicates the range of a zooming factor by which the object is displayed. The parameter "id" identifies the object. The parameter "size" indicates the display size corresponding to the zooming factor range.

The ID of a corresponding block element (FIG. 6A) in the mapping script is set to the parameter "id". For example, if the "zoomFactor" is set to "0.0 1.0", the object is displayed when the zooming factor of the parent object is in a range of "0.0" to "1.0". If the "zoomFactor" is set to "0.1 1.0", the object is not displayed when the zooming factor of the parent object is equal to "0.0" but it is displayed when the zooming factor of the parent object is in a range of "0.1" to "1.0".

For example, suppose that the object is an image and the "size" is set to "20% 50%", the image size is changed in the range of 20%-50% in correspondence with the range of the "zoomFactor". Suppose that the object is a text (character string) and the "size" is set to "8 pt 12 pt" (where pt denotes the point by which a character size is indicated), the character size is changed in the range of 8 pt-12 pt in correspondence with the range of the "zoomFactor". If the "size" is set to "50%" or "8 pt", the image or character size is held at a fixed size, regardless of the zooming factor.

Figure 7:
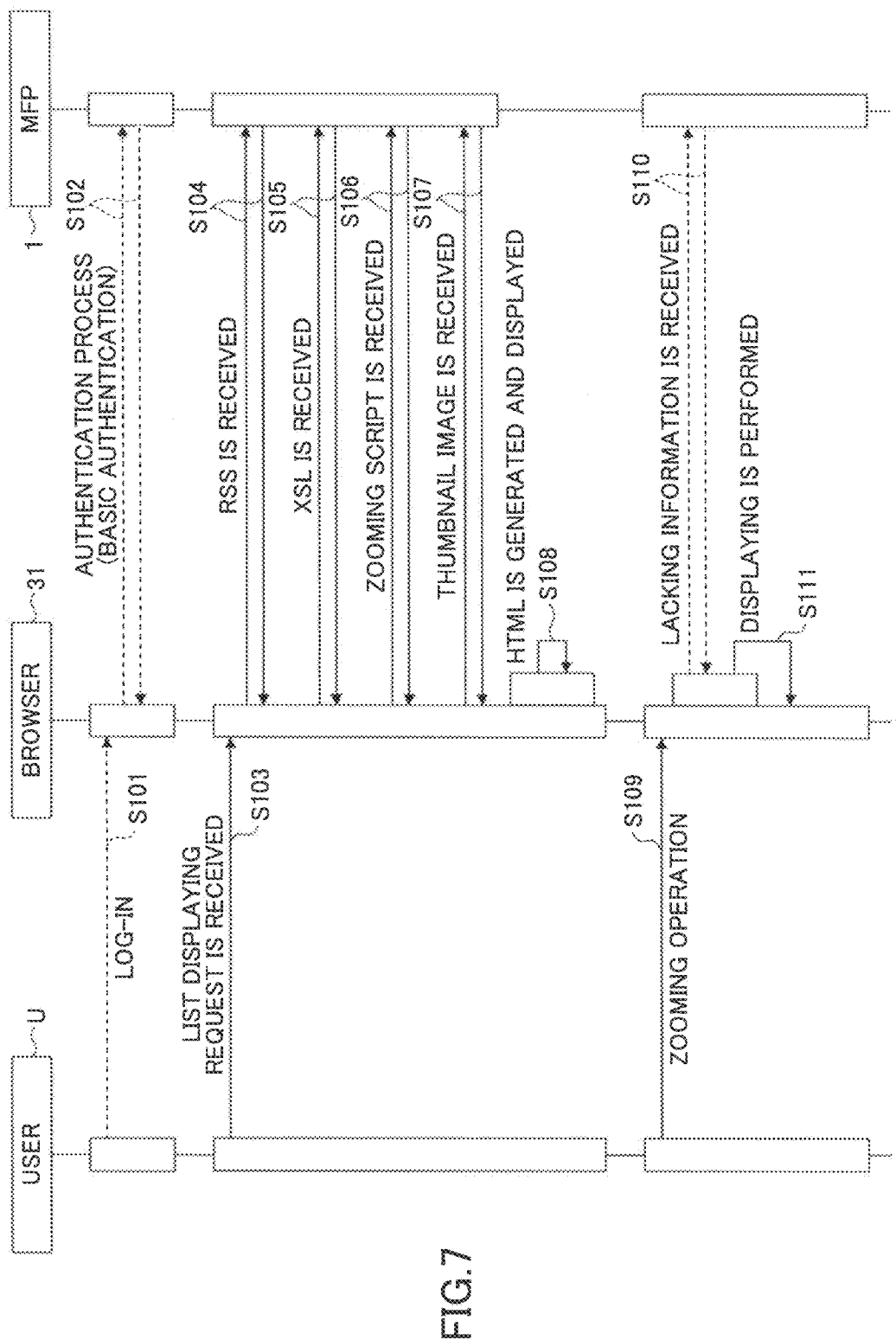
FIG. 7 is a sequence diagram for explaining the process performed by the image processing device of the first embodiment.

FIG. 7 is a sequence diagram for explaining the process performed by the image processing device of the first embodiment.

As shown in FIG. 7, when the user U performs a login procedure relating to the MFP 1 to the browser 31 by specifying a user ID, a password, etc. (step S101), the browser 31 starts performing an authentication process (basic authentication, etc.) between the browser 31 and the MFP 1 (step S102).

When the authentication is done normally, the notification is returned to the browser 31. When the authentication is not performed normally, an error code is returned to the browser 31.

If the viewing security is not needed, the login and authentication processes may be omitted. Alternatively, the subsequent processes may be changed for the case in which the login procedure is performed and the case in which the login procedure is not performed.

Subsequently, when the user U inputs a list displaying request to the browser 31 (step S103), the browser 31 receives an RSS from the MFP 1 (step S104), and continuously receives an XSL, a zooming script, a thumbnail image, etc. from the MFP 1 sequentially one by one based on the descriptions of the links included in the received RSS (steps S105-S107).

At this time, when the user U who has requested the list displaying does not perform a login procedure relating to the MFP 1, the MFP 1 may be arranged to prevent the user from receiving the RSS, the XSL, the zooming script, the thumbnail image, etc., or to restrict the content being supplied to the user such that only the content of the files having no problem on the security is supplied to the user.

Subsequently, the browser 31 generates an HTML file based on the RSS, the XSL, the zooming script, the thumbnail image, etc. which are received from the MFP 1, and displays the HTML file (step S108). Specifically, the browser 31 generates an HTML file by applying the XSL and the zooming script to the RSS, and displays the generated HTML file.

Subsequently, when the user U performs a zooming operation to the browser 31 through mouse operation or keyboard operation (step S109), the browser 31 receives the lacking information from the MFP 1, if needed (step S110), and performs the displaying according to the zooming operation (step S111). The lacking information at this time is, for example, information relating to the object which was not displayed before zooming operation but displaying of the object is needed by the zooming operation.

FIGS. 8 through 13B are diagrams showing examples of screens displayed in the browser 31.

Figure 8:
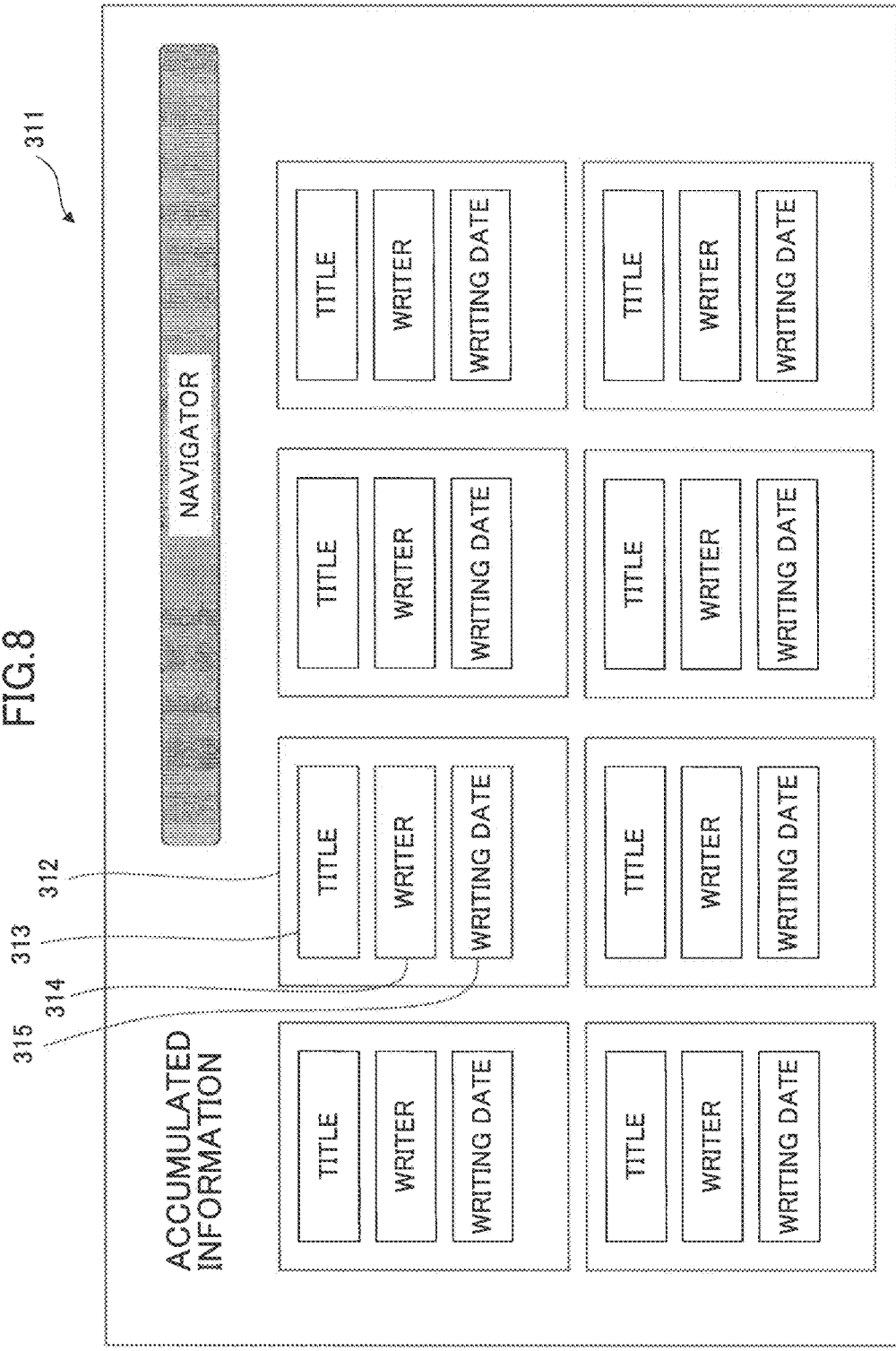
FIG. 8 is a diagram showing an example of a screen displayed by the browser.

FIG. 8 shows an example of an initial viewing screen 311. In the initial viewing screen 311 of FIG. 8, a plurality of "document" objects 312 (in the example, eight objects) are displayed with equal size. In each "document" object 312, a "title" object 313, a "writer" object 314, and a "writing date" object 315 are displayed. These objects 313-315 are set up such that the starting value of the parameter "zoomFactor" is the same as the value of the "initZoomFactor" in the zooming object description of the parent object (FIG. 6B), and they are displayed at the time of initial displaying. The starting value of the "zoomFactor" of the object which is not displayed at this time is set up as being larger than the value of the "initZoomFactor" in the zooming object description of the parent object.

Figure 9:
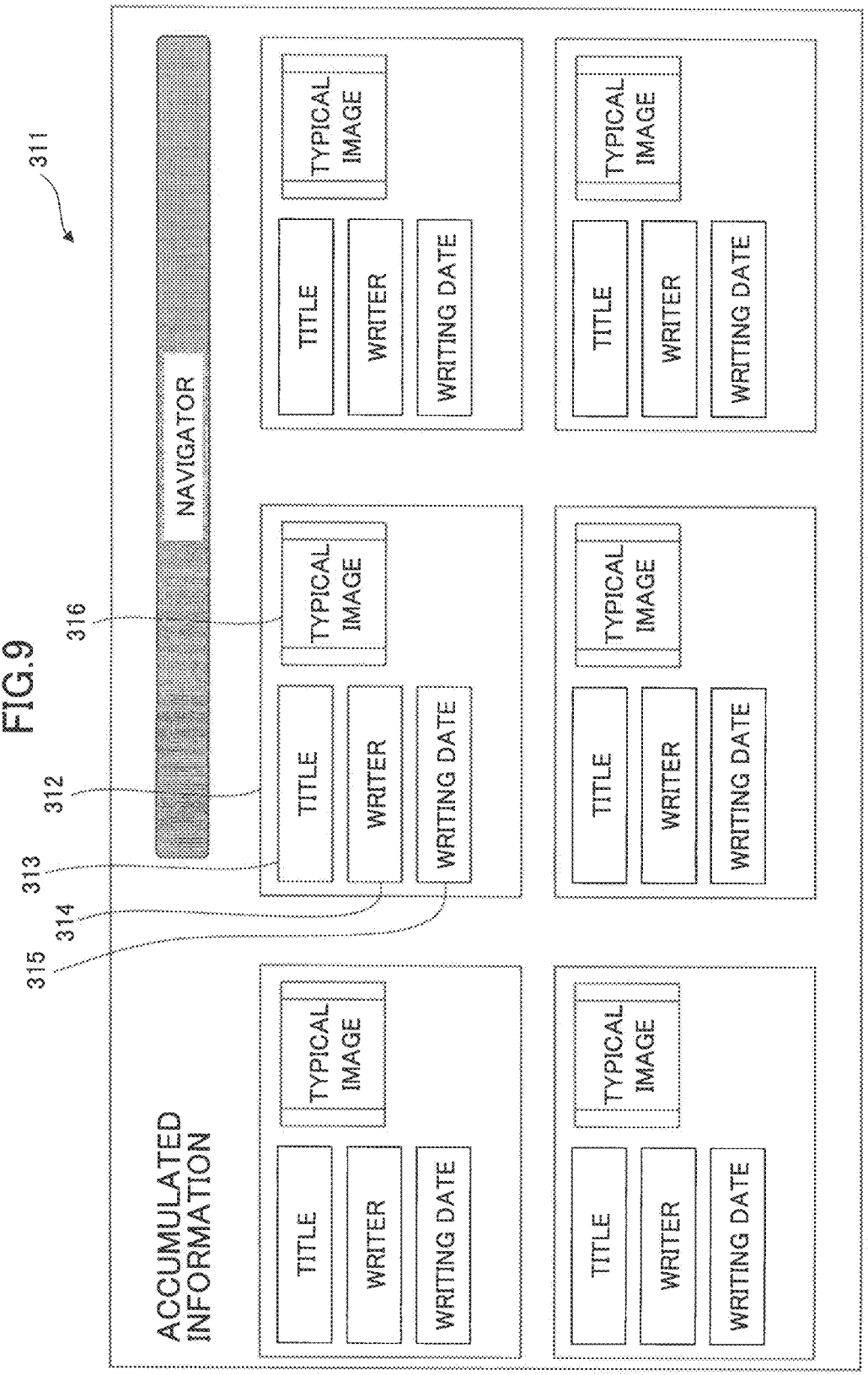
FIG. 9 is a diagram showing an example of a screen displayed by the browser.

FIG. 9 shows an example of the viewing screen 311 when a zooming operation is performed without selecting any of the "document" objects 312 in the viewing screen 311 of FIG. 8 (or when an upward scroll operation is performed in the margin part of the viewing screen 311).

In the example of FIG. 9, a plurality of "document" objects 312 are expanded equally, and "typical image" objects (thumbnail images) 316 which were not displayed before are displayed. The parameter "relatedTo" (FIG. 6B) in the zooming object description of the whole screen object which includes the plurality of "document" objects 312 is set up to "children:1.0", and the plurality of "document" objects 312 are expanded equally. The starting value of the "zoomFactor" of the "typical image" object 316 is set up as being larger than the value of the "initZoomFactor" in the zooming object description of the parent "document" object 312, and the displaying is performed when the zooming factor exceeds a certain value. The "document" objects which are placed beyond the margin are eliminated form the display area of the screen, and the number of the objects displayed is changed from eight to six. This is performed by the normal display function of the browser 31.

Figure 10:
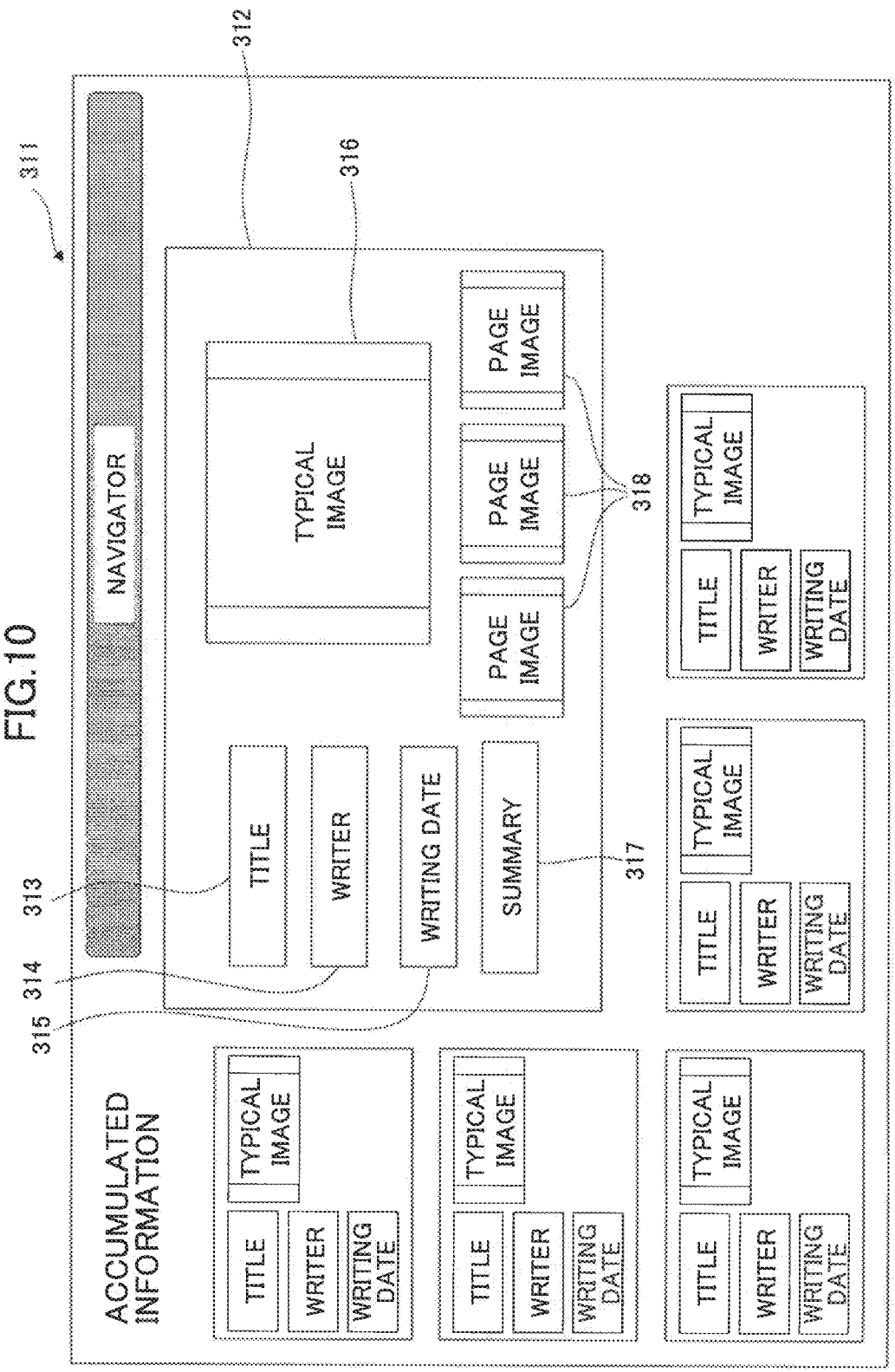
FIG. 10 is a diagram showing an example of a screen displayed by the browser.

FIG. 10 shows an example of the viewing screen 311 when a zooming operation is performed by selecting a specific "document" object 312 in the viewing screen 311 of FIG. 9.

In the example of FIG. 10, only the selected "document" object 312 is expanded and other "document" objects are reduced. The parameter "relatedTo" (FIG. 6B) in the zooming object description of the "document" object 312 is set up to "brother:−1.0", and the selected "document" object 312 is expanded and other "document" objects 312 are simultaneously reduced by the same ratio. In the selected "document" object 312, the "typical image" object 316 is expanded, and a "summary" object 317 and "page image" objects 318 which were not displayed before are displayed. The starting value of the "zoomFactor" is set up as being larger than the value of the "initZoomFactor" in the zooming object description of the parent "document" object 312, and the displaying of the "summary" object 317 and "page image" objects 318 is performed when the zooming factor exceeds a certain value. All the other "document" objects than the selected one are reduced equally.

Figure 11:
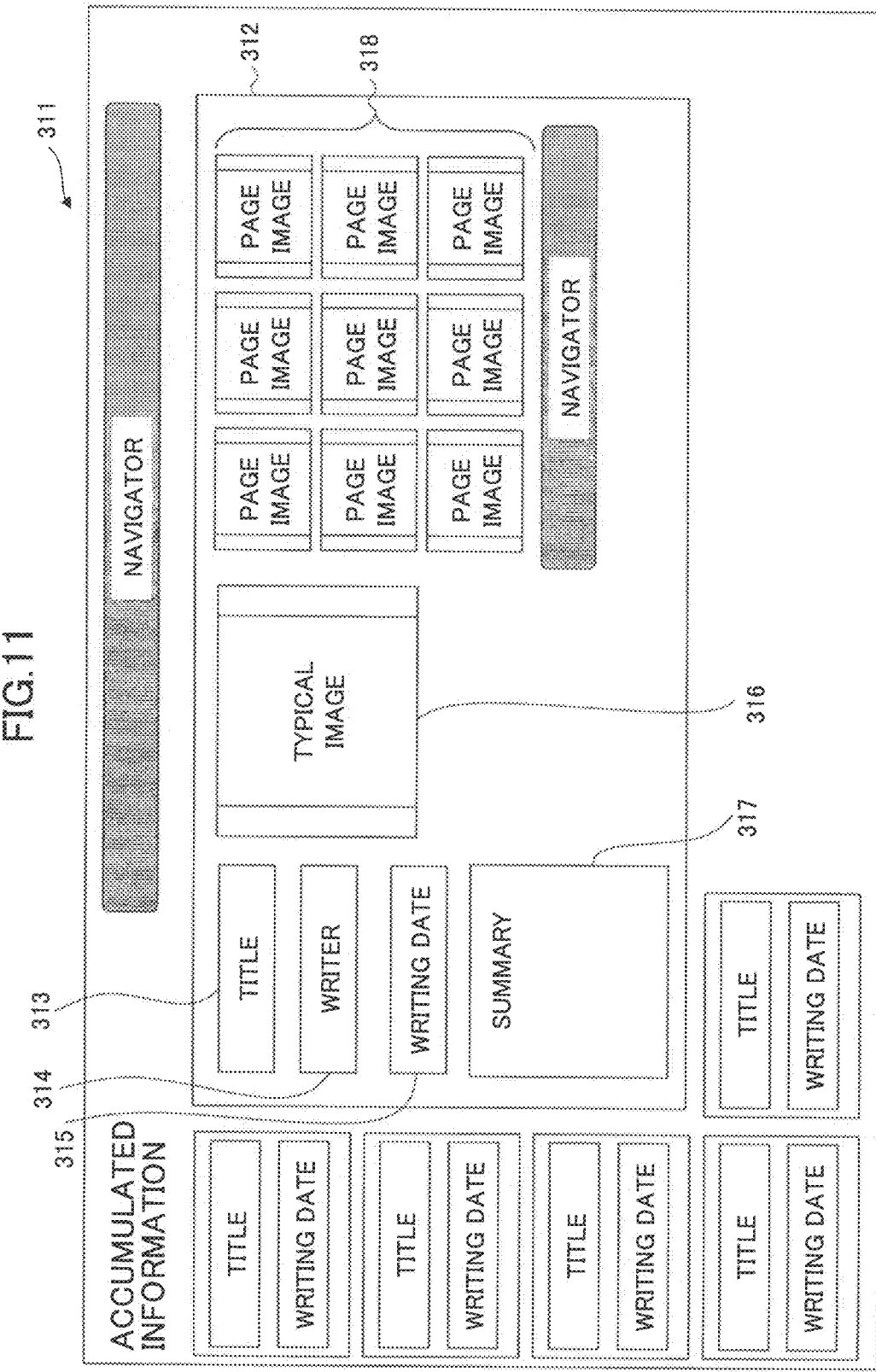
FIG. 11 is a diagram showing an example of a screen displayed by the browser.

FIG. 11 shows an example of the viewing screen 311 when a zooming operation is performed further by selecting the specific "document" object 312 in the viewing the screen 311 of FIG. 10.

In the example of FIG. 11, only the selected "document" object 312 is expanded further and other "document" objects 312 are reduced further. In the selected "document" object 312, the "summary" object 317 is expanded, and the number of "page image" objects 318 displayed is increased. In other "document" objects 312, the "writer" object and the "typical image" object which were displayed before are removed, and the "title" object and the "writing date" object are displayed. The range of the "zoomFactor" (FIG. 6B) of the "writer" object and the "typical image" object is set up such that the displaying range becomes out of range if the zooming factor exceeds a certain negative value, and the displaying of these objects is not performed when the zooming factor exceeds the negative value.

Figure 12:
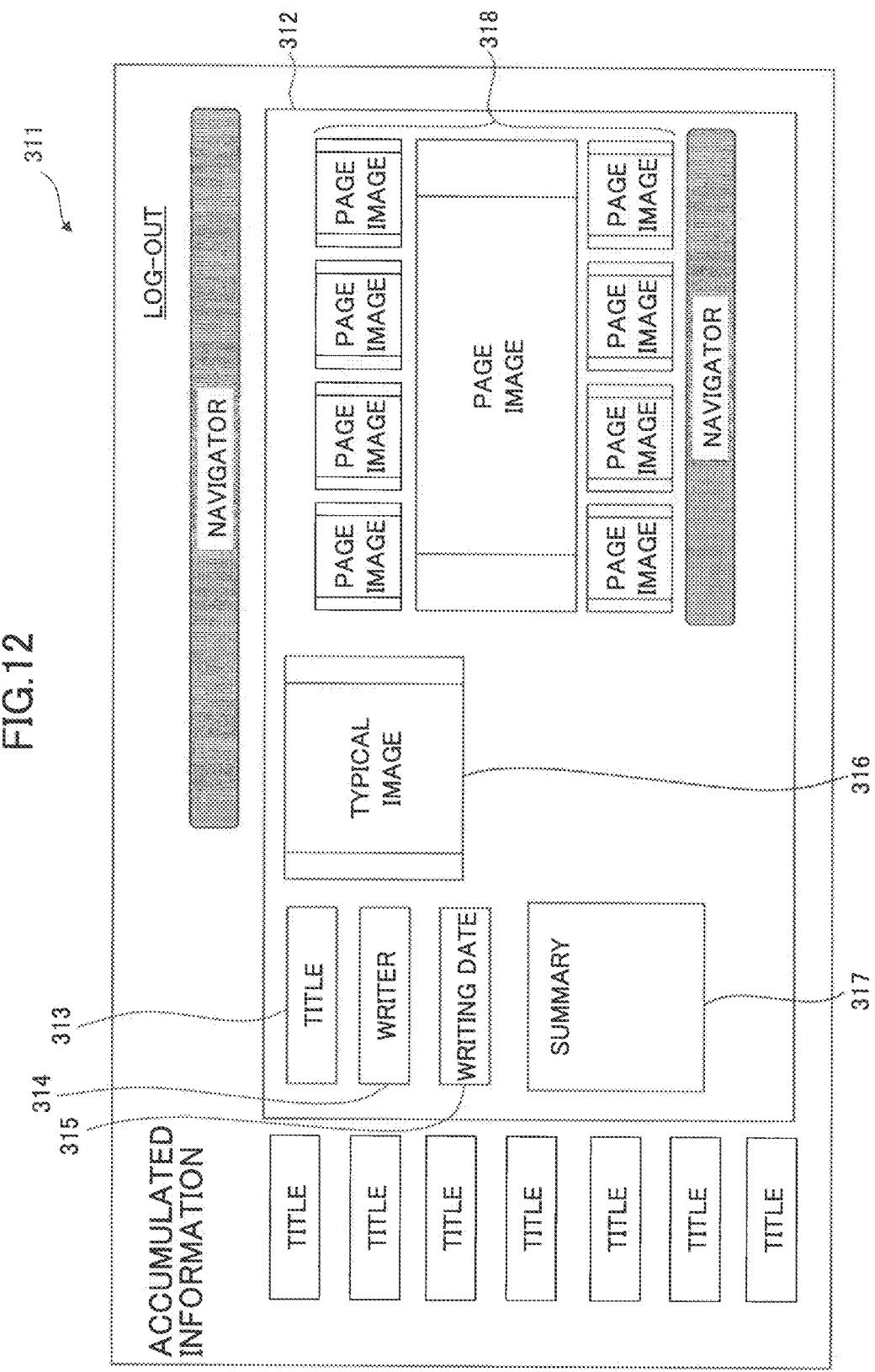
FIG. 12 is a diagram showing an example of a screen displayed by the browser.

FIG. 12 shows an example of the viewing screen 311 when a zooming operation is performed further by selecting the specific "document" object 312 in the viewing screen 311 of FIG. 11, and a zooming operation is performed further by selecting a specific "page image" object 318 in the "document" object 312.

In the example of FIG. 12, only the selected "document" object 312 is expanded further and other "document" objects 312 are reduced further. In the selected "document" object 312, the number of "page image" objects 318 displayed is increased, and the "page image" object to which the zooming operation is performed is expanded. In other "document" objects 312, the "writing date" object which was displayed before is removed, and only the "title" object is displayed.

FIG. 13A and FIG. 13B show examples of screens displayed when a zooming operation to a specific area is performed. Specifically, when a "region" object 319 in a "page image" object 318 shown in FIG. 13A is selected and a zooming operation is performed, a "region detailed information" object 320 is displayed as shown in FIG. 13B. In the "region detailed information" object 320, an "image file (URL information)", a "title", a "thumbnail (URL information)", a "key (URL information)", a "name", a "type", a "text", a "surrounding text", "X0 (position)", "Y0 (position)", "X1 (position)", "Y1 (position)", etc. are displayed.

In the above described first embodiment of the invention, a screen displaying HTML file is generated using an XSL file F2 (FIG. 2). An image processing device of a second embodiment of the invention is arranged to generate a screen displaying HTML file by using a format script file and a CSS (Cascading Style Sheets) file, such as files described in JavaScript or the like, without using an XSL file. Generation of an HTML file using an XSL file according to the first embodiment needs a relatively long processing time, and the time for completing the screen displaying is relatively long. However, the image processing device of the second embodiment uses a format script file and a CSS file, and an HTML file can be generated at high speed and it is possible to shorten the time for completing the screen displaying.

Figure 14:
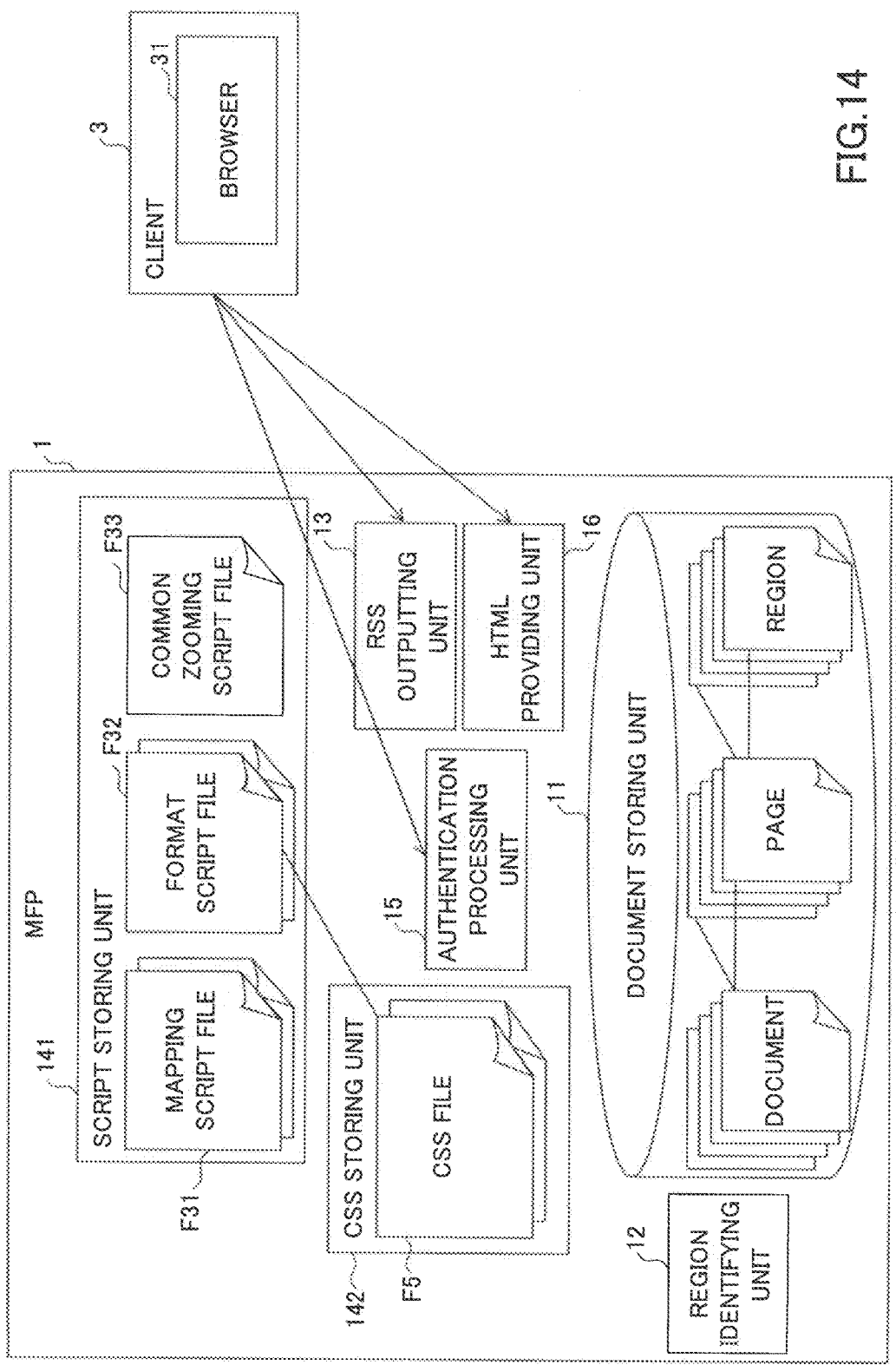
FIG. 14 is a diagram showing the composition of a first example of an image processing device of a second embodiment of the invention.

FIG. 14 shows the composition of a first example of the image processing device of the second embodiment.

As shown in FIG. 14, an MFP 1 which is the image processing device of this embodiment, and a client 3 (such as PC) which is operated by a user U are interconnected via a network.

The MFP 1 in this embodiment includes a document storing unit 11, a region identifying unit 12, an RSS outputting unit 13, a script storing unit 141, a CSS storing unit 142, an authentication processing unit 15, and an HTML providing unit 16.

The document storing unit 11 stores document images (body images, thumbnail images) and their bibliographic information (date, title, writer, summary, etc.).

The region identifying unit 12 analyzes the content of a document image, identifies regions (character regions, image regions, etc.), and adds information relating to the regions to the document storing unit 11.

The HTML providing unit 16 provides an HTML file of an operation screen including a login area in response to a displaying request received from the browser 31 of the client 3.

The RSS outputting unit 13 generates an RSS feed based on the document image, the bibliographic information, etc., which are stored in the document storing unit 11, and outputs the RSS feed to the requiring device.

The script storing unit 141 stores various kinds of script files linked to the RSS feed output from the RSS outputting unit 13, and supplies a corresponding script file in response to a script file request.

The CSS storing unit 142 stores various kinds of CSS files and supplies a corresponding CSS file in response to a CSS file request.

The authentication processing unit 15 performs an authentication process of a user.

In the script storing unit 141, a mapping script file F31 provided for each of displaying object lists, a format script file F32 provided for each of the displaying object lists, and a common zooming script file F33 provided in common for the displaying object lists are stored.

The mapping script file F31 is equivalent to the print log mapping script file F3 and the fax log mapping script file F3b shown in FIG. 3. The mapping script file F31 is a file which associates the models of documents, such as fax logs and print logs, with a zooming operation.

The format script file F32 is a script file described in JavaScript which defines the conversion processing (similar to the conversion processing by means of the XSL file F2 in FIG. 2) to convert an RSS feed in an HTML format to generate an HTML file. Specifically, the format script file F32 sets up the layout specified in the CSS file F5 in correspondence with the model of a document. Moreover, the format script file F32 indicates how to trace back to a metadata and detailed images (pages, regions, etc.) according to the model. For example, the relation, such as "/{$page no} {$region no}", can be traced back. Although the information without any access privilege is turned into the lacking information within the model, it is possible to realize masking in that case by replacing it by an alternative image or the like.

The common zooming script file F33 is equivalent to the common zooming script file F3c in FIG. 3, and it contains basic zooming scripts.

The CSS files F5 for the respective displaying object lists which are linked to the format script files F32 in the script storing unit 141 are stored in the CSS storing unit 142.

FIG. 15 shows the composition of a second example of the image processing device of the second embodiment. In the image processing device of FIG. 15, the authentication processing unit 15 is arranged outside the MFP 1. The authentication processing unit 15 is separated from the MFP 1, and the existing authentication systems arranged on the network may be used as the authentication processing unit 15. Because it is not necessary to newly set up user information including authority, the time and cost for construction of the network system in which the image processing device is arranged can be reduced.

FIG. 16 shows the composition of a third example of the image processing device of the second embodiment. In the image processing device of FIG. 16, the HTML providing unit 16, the script storing unit 141, and the CSS storing unit 142 are separated from the MFP 1 of the second example shown in FIG. 15, and the units 16, 141, and 142 are arranged into a Web application server 5.

Consequently, the MFP 1 requires only the functions of storing documents and outputting a RSS feed, and the range of the models of the MFP 1 to which the image processing device is applicable is expanded and the existing products can be used effectively.

FIGS. 17 through 19 are sequence diagrams for explaining respective processes performed by the first, second, and third examples of the image processing device of the second embodiment.

FIG. 17 is a sequence diagram for explaining the process performed by the first example of the image processing device of the second embodiment shown in FIG. 14.

As shown in FIG. 17, when the user U inputs a displaying request to the browser 31 (step S201), the browser 31 acquires an HTML file of an operation screen including the login area from the HTML providing unit 16 and displays the HTML file (step S202).

When the user U performs a login procedure to the browser 31 in response by specifying the user ID, the password, etc. (step S203), the browser 31 requests authentication of the authentication processing unit 15 with the user ID, the password, etc. When the authentication is done normally, the browser 31 receives an authentication token from the authentication processing unit 15 (step S204). On the other hand, when the authentication is not performed normally, an error code is returned to the browser 31.

Subsequently, when the user U inputs a fax record list RSS feed request to the browser 31 (step S205), the browser 31 requests acquisition of RSS feed, together with the authentication token, to the RSS outputting unit 13 (step S206). The RSS outputting unit 13 requests checking of the authentication token to the authentication processing unit 15. When the authentication token is checked normally by the authentication processing unit 15, the RSS outputting unit 13 receives the user information from the authentication processing unit 15 (step S207). The RSS outputting unit 13 outputs an RSS feed to the browser 31 (step S208).

On the other hand, when the checking is not performed normally, an error code is returned to the browser 31 via the RSS outputting unit 13.

FIG. 20 shows an example of an RSS feed which is received at the browser 31 immediately after authentication. As shown in FIG. 20, the RSS feed includes a description 101 which indicates the link to the common zooming script file F33, a description 102 which indicates the link to the format script file F32, a description 103 which indicates the link to the mapping script file F31, and a description 104 which indicates the initial display content.

FIG. 21 shows an example of the initial display content included in the RSS feed of FIG. 20. As shown in FIG. 21, in the initial display content, a plurality of items, each being surrounded by a pair of <div . . . > tag and </div> tag, are described.

The RSS outputting unit 13 performs filtering of the items to be included in the RSS feed, based on the user information acquired by the checking of the authentication token performed, beforehand, by the authentication processing unit 15. Specifically, in the document storing unit 11, the permission of displaying according to the user's viewing authority is set up beforehand for each unit of documents, pages, and regions as additional information. The RSS outputting unit 13 is arranged to include only the items with respect to documents for which the user has viewing authority, in the RSS feed.

For example, suppose that, in the example of FIG. 21, the user has no viewing authority for a description 105 of certain items. In such a case, the description 105 of such items is not included in the RSS feed by the RSS outputting unit 13 through the filtering performed based on the user information.

Referring back to FIG. 17, based on the descriptions of the links included in the received RSS feed, the browser 31 receives the common zooming script file F33, the format script file F32 (including the CSS file F5), and the mapping script file F31 from the RSS outputting unit 13 sequentially one by one (steps S209-S211).

Moreover, the browser receives necessary files, such as thumbnail images, from the RSS outputting unit 13 according to the contents of the received scripts (step S212).

Subsequently, the browser 31 generates an HTML file based on the common zooming script file F33, the format script file F32, the mapping script file F31, the thumbnail images, etc. which are received from the RSS outputting unit 13, and displays the HTML file (step S213). Specifically, the browser 31 executes the common zooming script file F33, the format script file F32 (including the CSS file F5), and the mapping script file F31, so that an HTML file is generated from the RSS feed and the HTML file is displayed. The zooming object description 303 (FIG. 6B) for zooming operation is included in the generated HTML file.

Subsequently, when the user U performs a zooming operation to the browser 31 through mouse operation or keyboard operation (step S214), the browser 31 requests the RSS outputting unit 13 to output the lacking information to the browser 31 if needed (step S215). The lacking information is, for example, information concerning a certain object when displaying of an object which has not been displayed before the zooming operation is needed.

The RSS outputting unit 13 checks the user information and the access privilege (step S216), and returns the fax image, the metadata, etc. which are suited to the user information and the access privilege, to the browser 31 (step S217).

Subsequently, the browser 31 performs the displaying in accordance with the zooming operation (step S218). The example of the display according to the zooming operation is the same as those shown in FIGS. 8-13B.

FIG. 22 shows an example of masking of the displaying in the process of the zooming operation. As shown in FIG. 22, in the viewing screen 311, only the objects for which the current user has viewing authority are displayed, which include "title" object 313, "writing date" object 315, "summary" object 317, and "typical image" object 316. Other objects including "writer" object 314 and "page image" object 318 are masked in the viewing screen 311, and they are held in an invisible state.

Any of various masking methods is applicable. The applicable masking method may include the completely blanking method, the mosaic attaching method, the fading state allocating method, etc.

FIG. 18 is a sequence diagram for explaining the process performed by the second example of the image processing device of the second embodiment shown in FIG. 15.

As shown in FIG. 18, when the user U inputs a displaying request to the browser 31 (step S221), the browser 31 acquires an HTML file of an operation screen, including the login area, from the HTML providing unit 16 and displays the HTML file (step S222).

When the user U performs a login procedure to the browser 31 by specifying the user ID, the password, etc. (step S223), the browser 31 requests authentication of the HTML providing unit 16 with the user ID, the password, etc. (step S224).

The HTML providing unit 16 transmits the authentication request to the authentication processing unit 15. When the authentication is done normally, the HTML providing unit 16 receives an authentication token from the authentication processing unit 15 (step S225). The HTML providing unit 16 transmits the authentication token to the browser 31 (step S226).

On the other hand, when the authentication is not performed normally, an error code is returned to the browser 31 via the HTML providing unit 16.

Subsequently, when the user U inputs a fax record list RSS feed request to the browser 31 (step S227), the browser 31 requests acquisition of an RSS feed, together with the authentication token, to the RSS outputting unit 13 (step S228).

The RSS outputting unit 13 requests the checking of the authentication token to the authentication processing unit 15. When the authentication token is checked normally by the authentication processing unit 15, the RSS outputting unit 13 receives the user information from the authentication processing unit 15 (step S229). The RSS outputting unit 13 outputs an RSS feed to the browser 31 (step S230).

On the other hand, when the checking is not performed normally, an error code is returned to the browser 31 via the RSS outputting unit 13.

Subsequently, based on the descriptions of the links included in the received RSS feed, the browser 31 receives the common zooming script file F33, the format script file F32 (including the CSS file F5), and the mapping script file F31 from the RSS outputting unit 13 sequentially one by one (steps S231-S233).

Moreover, the browser 31 receives necessary files, such as thumbnail images, from the RSS outputting unit 13 according to the contents of the received scripts (step S234).

Subsequently, the browser 31 generates an HTML file based on the common zooming script file F33, the format script file F32, the mapping script file F31, the thumbnail images, etc. which are received (step S235). Specifically, the browser 31 executes the common zooming script file F33, the format script file F32 (including the CSS file F5), and the mapping script file F31, so that an HTML file is generated from the RSS feed and the HTML file is displayed.

Subsequently, when the user U performs a zooming operation to the browser 31 through mouse operation or keyboard operation (step S236), the browser 31 requests receiving of the lacking information to the RSS outputting unit 13, if needed (step S237).

The RSS outputting unit 13 checks the user information and the access privilege (step S238), and returns the fax image, the metadata, etc., which are suited to the user information and the access privilege, to the browser 31 (step S239).

The browser 31 performs the displaying in accordance with the zooming operation (step S240).

Next, FIG. 19 is a sequence diagram for explaining the process performed by the third example of the image processing device of the second embodiment shown in FIG. 16.

As shown in FIG. 19, when the user U inputs a displaying request to the browser 31 (step S251), the browser 31 acquires an HTML file of an operation screen including the login area, from HTML providing unit 16 and displays the HTML file (step S252).

When the user U performs a login procedure to the browser 31 in response by specifying the user ID, the password, etc. (step S253), the browser 31 requests authentication of HTML providing unit 16 with the user ID, the password, etc. (step S254). The HTML providing unit 16 transmits the same request to the authentication processing unit 15. When the authentication is done normally, the HTML providing unit 16 receives an authentication token from the authentication processing unit 15 (step S255), and transmits the authentication token to the browser 31 (step S256).

On the other hand, when the authentication is not performed normally, an error code is returned to the browser 31 via the HTML providing unit 16.

Subsequently, when the user U inputs a fax record list RSS feed request to the browser 31 (step S257), the browser 31 requests receiving of an RSS feed, together with the authentication token, to the HTML providing unit 16 (step S258).

The HTML providing unit 16 requests the checking of the authentication token to the authentication processing unit 15. When the authentication token is checked normally, the HTML providing unit 16 receives the user information from the authentication processing unit 15 (step S259), and the HTML providing unit 16 outputs an RSS feed to the browser 31 (step S260).

On the other hand, when the checking is not performed normally, an error code is returned to the browser 31 via the HTML providing unit 16.

Subsequently, based on the descriptions of the links included in the received RSS feed, the browser 31 receives the common zooming script file F33, the format script file F32 (including the CSS file F5), and the mapping script file F31 from the HTML providing unit 16 sequentially one by one (steps S261-S263).

Moreover, the browser 31 receives necessary files, such as thumbnail images, from the RSS outputting unit 13 via the HTML providing unit 16 according to the contents of the received scripts (steps S264-S266). The browser 31 may acquire the files, such as thumbnail images, directly from the RSS outputting unit 13.

Subsequently, the browser 31 generates an HTML file based on the common zooming script file F33, the format script file F32, the mapping script file F31, the thumbnail images, etc. which are received, and displays the HTML file (step S267). Specifically, the browser 31 executes the common zooming script file F33, the format script file F32 (including the CSS file F5) and the mapping script file F31, so that an HTML file is generated from the RSS feed and it is displayed.

When the user U performs a zooming operation to the browser 31 through mouse operation or keyboard operation (step S268), the browser 31 requests receiving of the lacking information, to the RSS outputting unit 13 via the HTML providing unit 16, if needed (steps S269, S270).

The RSS outputting unit 13 checks the user information and the access privilege (step S271), and returns the fax image, the metadata, etc. which are suited to the user information and the access privilege, to the browser 31 via the HTML providing unit 16 (steps S272, S273). The browser 31 may receive the lacking information directly from the RSS outputting unit 13. Finally, the browser 31 performs the displaying in accordance with the zooming operation (step S274).

In the above-mentioned processes of FIGS. 17-19, the common zooming script file F33, the format script file F32 (including the CSS file F5), and the mapping script file F31 are executed by the browser 31 to generate an HTML file. Alternatively, instead of the browser 31, the HTML providing unit 16 may execute the common zooming script file F33, the format script file F32 (including the CSS file F5), and the mapping script file F31 to generate an HTML file and may supply the generated HTML file to the browser 31.

The above-described embodiments of the invention may provide the following advantages: (1) because the image processing device of the invention is arranged based on the RSS distribution, the user is enabled to view document information using a general-purpose browser implemented in a client, such as a PC, as standard equipment; (2) it is possible to perform efficient viewing operation to view the stored document information without discontinuing the operation, because the user is enabled to perform zoom-in/zoom-out operation in the screen by specifying freely a display element displayed in the screen, until the desired content is found out;

(3) the image processing device of the invention generally enables the user to perform efficient viewing operation.

The present invention is not limited to the above-described embodiments, and variations and modifications may be made without departing from the scope of the present invention.

The present application is based on Japanese patent application No. 2007-152026, filed on Jun. 7, 2007, and Japanese patent application No. 2008-109513, filed on Apr. 18, 2008, the contents of which are incorporated herein by reference in their entirety.

What is claimed is:

1. An image processing device comprising:
    a document storing unit configured to store a plurality of document information containing scanned images and fax transmission/reception images sent from a plurality of users;
    a metadata outputting unit configured to generate metadata for each document information stored by the document storing unit, and to distribute the metadata;
    a display format file supplying unit configured to supply a display conversion file linked to the metadata;
    a zooming process file supplying unit configured to supply a zooming process file linked to the metadata, the zooming process file including a zoom factor parameter for each of a plurality of thumbnails of the images and each of the metadata of each document information, the zoom factor parameter indicating a range of a zooming factor by which each corresponding one of the thumbnails and metadata is displayed,
    wherein
        the plurality of thumbnails and the metadata are zoomed an equal amount when a zooming process is performed without specifying the document information, and
        in response to a zooming operation of a user, whether to display or not display the thumbnails and metadata for each document information is determined based on the range of the zooming factor indicated by the zoom factor parameter of the corresponding one of the thumbnails and the metadata; and
    a document information supplying unit configured to read a document information item, requested at a time of displaying, from the document storing unit and supply the document information item.

2. The image processing device according to claim 1, further comprising:
    an authentication unit configured to authenticate a user who performs a login procedure, and supply user information,
    wherein the metadata outputting unit is configured to generate metadata of a document information item with a viewing authority of the user in accordance with the user information and distribute the metadata, and the document information supplying unit is configured to distribute the document information item with the viewing authority of the user in accordance with the user information.

3. The image processing device according to claim 1, wherein the zooming process file includes:
    a mapping script which associates a thumbnail, contained in a displaying file produced from the display conversion file, with the zooming process; and
    an event processing script which performs the zooming process to a display element in response to operation of a user.

4. The image processing device according to claim 1, wherein the document storing unit is configured to manage the document information in hierarchical levels according to components of the document information.

5. The image processing device according to claim 4, wherein the metadata outputting unit is configured to distribute the metadata according to hierarchical levels of components of the document information.

6. The image processing device according to claim 1, wherein the metadata includes an RSS feed which is an XML based format.

7. The image processing device according to claim 6, wherein the display conversion file is an XSL file which converts the RSS feed in an HTML format to generate an HTML file.

8. The image processing device according to claim 6, wherein the display conversion file includes a format script file and a CSS file which convert the RSS feed in an HTML format to generate an HTML file.

9. A viewing control method, implemented on an image processing apparatus including a document storage unit, the method comprising:
    storing, at the document storage unit, a plurality of document information containing scanned images and fax transmission/reception images sent from a plurality of users;
    generating metadata for each document information stored, and distributing the metadata;
    supplying a display conversion file linked to the metadata;
    supplying a zooming process file linked to the metadata, the zooming process file including a zoom factor parameter for each of a plurality of thumbnails of the images and each of the metadata of each document information, the zoom factor parameter indicating a range of a zooming factor by which each corresponding one of the thumbnails and metadata is displayed,
    wherein
        the plurality of thumbnails and the metadata are zoomed an equal amount when a zooming process is performed without specifying the document information, and
        in response to a zooming operation of a user, whether to display or not display the thumbnails and metadata for each document information is determined based on the range of the zooming factor indicated by the zoom factor parameter of the corresponding one of the thumbnails and the metadata; and
    reading a document information item, requested at a time of displaying, to supply the document information item.

10. The viewing control method according to claim 9, further comprising:
    authenticating a user who performs a login procedure, to supply user information,
    wherein the generating step is configured to generate metadata of a document information item with a viewing authority of the user in accordance with the user information and distribute the metadata, and the reading step is configured to distribute the document information item with the viewing authority of the user in accordance with the user information.

11. The viewing control method according to claim 9, wherein the zooming process file includes:
    a mapping script which associates a thumbnail, contained in a displaying file produced from the display conversion file, with the zooming process; and
    an event processing script which performs the zooming process to a display element in response to operation of a user.

12. The viewing control method according to claim 9, wherein the storing step is configured to manage the document information in hierarchical levels according to components of the document information.

13. The viewing control method according to claim 12, wherein the reading step is configured to distribute the metadata according to hierarchical levels of components of the document information.

14. The viewing control method according to claim 9, wherein the metadata includes an RSS feed which is an XML based format.

15. The viewing control method according to claim 14, wherein the display conversion file is an XSL file which converts the RSS feed in an HTML format to generate an HTML file.

16. The viewing control method according to claim 14, wherein the display conversion file includes a format script file and a CSS file which convert the RSS feed in an HTML format to generate an HTML file.

\* \* \* \* \*